United States Patent
Gan et al.

(10) Patent No.: US 9,667,166 B2
(45) Date of Patent: May 30, 2017

(54) FIVE-LEVEL CONVERTING DEVICE

(71) Applicant: Delta Electronics (Shanghai) Co., Ltd., Shanghai (CN)

(72) Inventors: Hong-Jian Gan, Shanghai (CN); Bo-Yu Pu, Shanghai (CN); Ming Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/134,401

(22) Filed: Apr. 21, 2016

(65) Prior Publication Data

US 2017/0012552 A1 Jan. 12, 2017

(30) Foreign Application Priority Data

Jul. 10, 2015 (CN) .......................... 2015 1 0405530

(51) Int. Cl.
    *H02M 7/12* (2006.01)
    *H02M 7/483* (2007.01)
    *H02M 7/487* (2007.01)

(52) U.S. Cl.
    CPC ............. *H02M 7/12* (2013.01); *H02M 7/487* (2013.01)

(58) Field of Classification Search
    CPC ...... H02M 7/12; H02M 7/483; H02M 7/4835; H02M 7/487
    See application file for complete search history.

(56) References Cited

U.S. PATENT DOCUMENTS

| | | | | |
|---|---|---|---|---|
| 2008/0315859 A1* | 12/2008 | Ponnaluri | ............. | H02M 7/487 323/351 |
| 2012/0218795 A1* | 8/2012 | Mihalache | ............ | H02M 7/487 363/97 |
| 2014/0211520 A1* | 7/2014 | Zhang | ................... | H02M 7/487 363/37 |
| 2014/0293667 A1* | 10/2014 | Schroeder | ............. | H02M 7/483 363/60 |

(Continued)

FOREIGN PATENT DOCUMENTS

| CN | 100466448 C | 3/2009 |
|---|---|---|
| CN | 102624269 B | 9/2014 |

(Continued)

*Primary Examiner* — Jue Zhang
(74) *Attorney, Agent, or Firm* — CKC & Partners Co., Ltd.

(57) ABSTRACT

A five-level converting device includes a first switch module, a second switch module and a third switch modules each connects to a neutral point, a positive terminal and a negative terminal of a bus capacitor module. A first switch module includes a plurality of bidirectional switching circuits cascaded to each other, and each bidirectional switching circuit includes two first switching units reversely connected in series. Second switch module includes a plurality of second switching units connected in series. Third switch module includes a plurality of third switching units connected in series. A first flying capacitor unit is connected across the first switching module and a second switch module, and a second flying capacitor unit is connected across the first switching module and a third switching module. The first flying capacitor unit and the second flying capacitor unit are connected to different connection points between the first switch units respectively.

24 Claims, 13 Drawing Sheets

(56) References Cited

U.S. PATENT DOCUMENTS

| | | | | |
|---|---|---|---|---|
| 2015/0155770 A1* | 6/2015 | Ying | ............... | H02M 7/217 307/52 |
| 2015/0200602 A1* | 7/2015 | Narimani | ............ | H02M 5/4585 363/37 |
| 2015/0280608 A1* | 10/2015 | Yoscovich | ............ | H02M 7/483 363/131 |
| 2015/0311776 A1* | 10/2015 | Lavieville | ............. | H02M 7/487 363/65 |

FOREIGN PATENT DOCUMENTS

| | | |
|---|---|---|
| CN | 103023363 B | 4/2015 |
| CN | 103236797 B | 7/2015 |
| CN | 103178721 B | 9/2015 |
| CN | 204633631 U | 9/2015 |
| TW | 1427905 B | 2/2014 |

\* cited by examiner

FIVE-LEVEL CONVERTING DEVICE

RELATED APPLICATIONS

This application claims priority to China Application Serial Number 201510405530.9, filed Jul. 10, 2015, which is herein incorporated by reference.

BACKGROUND

Field of Invention

The present invention relates to a multi-level converting device. More particularly, the present invention relates to a five-level converting device.

Description of Related Art

In high power applications, compared to the low-voltage system, the current level of the medium-voltage system or of the high-voltage system is lower, and with higher efficiency and better economy. Therefore, the medium-voltage system and the high-voltage system are the best choices in the field of high power conversion.

For the medium-voltage system and the high-voltage system, the voltage rating and the larger dv/dt of the existing power device are the two main problems, which make the multi-level technology get more attention and application.

SUMMARY

The present disclosure provides a simple topological structure of a five-level converting device with a good application value.

The five-level converting device of the present disclosure includes an AC terminal, a bus capacitor module, a first switch module, a second switch module, a third switch module, a first flying capacitor unit and a second flying capacitor unit. The bus capacitor module has a positive terminal, a negative terminal and a neutral point. Two terminals of the first switch module connected to the neutral point of the bus capacitor module and the AC terminal respectively, wherein the first switch module includes a plurality of bidirectional switching circuits cascaded to each other, each of the bidirectional switching circuits includes two first switching units reversely connected in series. Two terminals of the second switch module connect to the positive terminal of the bus capacitor module and the AC terminal respectively, wherein the second switch module include a plurality of second switching units connected in series. Two terminals of the third switch module connect to the negative terminal of the bus capacitor module and the AC terminal respectively, wherein the third switch module includes a plurality of third switching units connected in series. The first flying capacitor unit connects across the first switch module and the second switch module, the second flying capacitor unit connects across the first switch module and the third switch module, wherein the first flying capacitor unit and the second flying capacitor unit are connected to different connection points between the first switching units of the first switch module.

In summary, comparing to the conventional art, the technical device of the present disclosure has obvious advantages and benefits. The present disclosure uses asymmetrical circuit structure (two flying capacitor units has different connections), thereby the circuit design is more flexible and resilient. Compared to the conversion three-level technology, the five-level conversion technology here has better electrical performance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
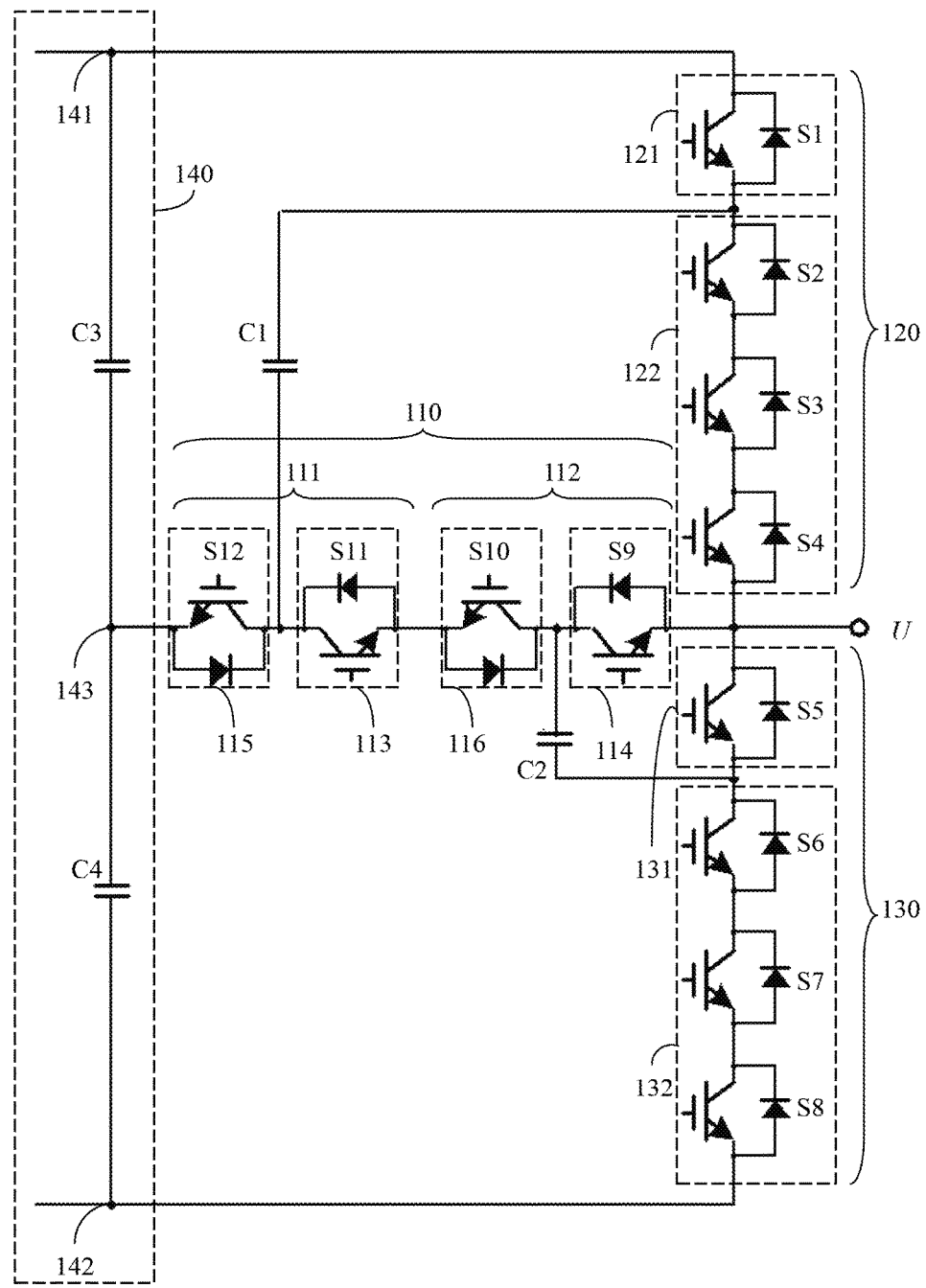
FIG. 1 is a diagram illustrating a circuit diagram of a five-level converting device according to a first exemplary embodiment of the present disclosure.

Reference will now be made in detail to the present embodiments of the invention, examples of which are illustrated in the accompanying drawings. Wherever possible; the same reference numbers are used in the drawings and the description to refer to the same or like parts. On the other hand, the well-known elements are not described in the exemplary embodiments, to avoid unnecessary restrictions of the present invention.

As used herein, "about", "approximately" or "around" describe amounts which are subject to slight variations in the actual value but such variations do not have material impact. Unless otherwise noted in the embodiment, the amounts described by "about", "around" or "approximately" typically have a level of tolerance of under twenty percent, or, better, under ten percent, or, better still, under five percent.

An aspect of the present disclosure is a five-level converting device, as shown in FIG. 2, FIG. 4, FIG. 6, FIG. 8, FIG. 10, and FIG. 12, the five-level converting device can be embodied as a AC-DC converter (or also known as rectifier or rectifying device), to convert the single-phase, three-phase, multi-phase AC voltage into a DC voltage. In addition, as shown in FIG. 1, FIG. 3, FIG. 5, FIG. 7, FIG. 9, and FIG. 11, the five-level converting device can be embodied as DC-AC converter (or also known as inverter or inverting device), to convert the DC voltage into a single-phase, three-phase, multi-phase AC voltage, thereby can be used to drive the load. Or, as shown in FIG. 1, FIG. 3, FIG. 5, FIG. 7, FIG. 9, and FIG. 11, the five-level converting device can be used in an AC-DC converter. The exemplary embodiments of the present disclosure will be explained with the help of FIG. 1~FIG. 12.

FIG. 1 is a diagram illustrating a circuit diagram of a five-level converting device (using single-phase as an example) according to a first exemplary embodiment of the present disclosure. As shown in FIG. 1, the five-level converting device 100 includes a AC terminal U, a first switch module 110, a second switch module 120, a third switch module 130, a first flying capacitor unit C1, a second flying capacitor unit C2 and a bus capacitor module 140.

In FIG. 1, the bus capacitor module 140 has a positive terminal 141, a negative terminal 142 and a neutral point 143. One of the two terminals of the first switch module 110 connects to the neutral point 143 and another terminal connects to the AC terminal U, wherein the first switch module 110 includes a first bidirectional switching circuit 111 and a second bidirectional switching circuit 112 cascaded to each other, the first bidirectional switching circuit 111 includes two first switching units 113 and 115 which are reversely connected in series, the second bidirectional switching circuit 112 includes two first switching units 114 and 116 which are reversely connected in series. One of the two terminals of the second switch module 120 connects to the positive terminal 141 and another terminal connects to the AC terminal U, wherein the second switch module 120 includes a plurality of second switching units 121 and 122 connected in series. One of the two terminals of the third switch module 130 connects to the negative terminal 142 of the bus capacitor module 140, and another terminal connects to the AC terminal U, wherein the third switch module 130 includes a plurality of third switching units 131 and 132 connected in series. The first flying capacitor unit C1 connects across the first switch module 110 and the second switch module 120, the second flying capacitor unit C2 connects across the first switch module 110 and the third switch module 130, wherein in the first switch module 110, the first switching units 113 and 115 only connect to the first flying capacitor unit C1 and do not connect to the second flying capacitor unit C2, and the first switching units 114 and 116 only connect to the second flying capacitor unit C2 and do not connect to the first flying capacitor unit C1. In this exemplary embodiment, the first flying capacitor unit C1 and the second flying capacitor unit C2 respectively include a capacitor, or a plurality of capacitors, wherein when a plurality of capacitors are included, the capacitors can connect in series, in parallel or in series-parallel.

The first bidirectional switching circuit 111 connects to the neutral point 143, the second bidirectional switching circuit 112 connects to the AC terminal U, a terminal of the first flying capacitor unit C1 connects to a connection point between the two first switching units 113 and 115 of the first bidirectional switching circuit 111, a terminal of the second flying capacitor unit C2 connects to a connection point between the two first switching units 114 and 116 of the second bidirectional switching circuit 112, between the two aforementioned connection points are an interval of the first switching units 113 and 116, thereby the two aforementioned connection points do not directly connect to each other. Another terminal of the first flying capacitor unit C1 connects to a connection point between the two second switching units 121 and 122, another terminal of the second flying capacitor unit C2 connects to a connection point between the two third switching units 131 and 132.

In FIG. 1, each of the first switching units 114, 116, 113 and 115 includes a corresponding power semiconductor switch S9, S10, S11, or S12. An emitter of the power semiconductor switch S9 connects to the AC terminal U, a collector of the power semiconductor switch S9 connects to a collector of the power semiconductor switch S10, an emitter of the power semiconductor switch S10 connects to an emitter of the power semiconductor switch S11, a collector of the power semiconductor switch S11 connects to the collector of the power semiconductor switch S12, and an emitter of the power semiconductor switch S12 connects to the neutral point 143. Each of the power semiconductor switches S9, S10, S11, and S12 connects to a diode connected inside, the diode connected inside and the power semiconductor switch itself reversely connect in parallel; for example, an anode of the diode connected inside of the power semiconductor switch S9 connects to the emitter of the power semiconductor switch S9, and a cathode of the diode connected inside of the power semiconductor switch S9 connects to the collector of the power semiconductor switch S9. The amounts of the power semiconductor switches of each of the first switching units 114, 116, 113 and 115 are only examples, not meant to be a limitation of the present disclosure. People skilled in this art can flexibly choose the amount of the power semiconductor switches and the corresponding withstand voltage according to the design requirements. In other exemplary embodiments, each of the first switching units 114, 116, 113 and 115 respectively includes at least one power semiconductor switch, when the amount of the power semiconductor switches of each of the first switching unit is more than one, the power semiconductor switches can connect in series, in parallel, or in series-parallel.

The second switching unit 121 includes at least one power semiconductor switch, for connecting to the positive terminal 141, in this exemplary embodiment, a single power semiconductor switch S1 is used as an example, and the second switching unit 122 includes at least one power semiconductor switch for connecting to the terminal U, herein three power semiconductor switches S2, S3, and S4 are used as an example, in which voltage withstand characters of the power semiconductor switches S1, S2, S3, and S4 are about the same. In particular, the collector of the power semiconductor switch S1 connects to the positive terminal 141, the emitter of the power semiconductor switch S1 connects to the collector of the power semiconductor switch S2, the emitter of the power semiconductor switch S2 connects to the collector of the power semiconductor switch S3, the emitter of the power semiconductor switch S3 connects to the collector of the power semiconductor switch S4, and the emitter of the power semiconductor switch S4 connects to the AC terminal U. Each of the power semiconductor switches S1, S2, S3, and S4 has a corresponding diode connected inside, and each of the diodes reversely connects in parallel with the corresponding power semiconductor switch.

The third switching unit 131 includes at least one power semiconductor switch for connecting to the AC terminal U, in this exemplary embodiment, a single power semiconductor switch S5 is used as an example, and the third switching unit 132 includes at least one power semiconductor switch for connecting to the negative terminal 142, herein three power semiconductor switches S6, S7, and S8 are used as an example, in which a voltage withstand character of each of the power semiconductor switches S5, S6, S7, and S8 are about the same. In particular, the collector of the power semiconductor switch S5 connects to the AC terminal U, the emitter of the power semiconductor switch S5 connects to the collector of the power semiconductor switch S6, the emitter of the power semiconductor switch S6 connects to the collector of the power semiconductor switch S7, the emitter of the power semiconductor switch S7 connects to the collector of the power semiconductor switch S8, and the emitter of the power semiconductor switch S8 connects to the negative terminal 142. Each of the power semiconductor switches S5, S6, S7, and S8 has a corresponding diode connected inside, and each of the diodes reversely connects in parallel with the corresponding power semiconductor switch.

Please note that the amounts of the power semiconductor switches in each of the second switching units 121, 122 and of the third switching units 131, 132 are for the illustrative purposes only, and do not meant to be a limitation of the present disclosure, people skilled in this field can choose the amount of the power semiconductor switches and the corresponding withstanding voltages according to the design requirements. For example, the three power semiconductor switches S2, S3, and S4 connected in series can be integrate into a single power semiconductor switch, and the withstand voltage of that single power semiconductor switch is about the same as the total withstand voltage of the power semiconductor switches S2, S3, and S4 combined. In addition, the three power semiconductor switches S6, S7, and S8 connected in series can be integrate into a single power semiconductor switch, and the withstand voltage of that single power semiconductor switch is about the same as a sum of the withstand voltages of the power semiconductor switches S6, S7, and S8. For example, the second switching unit 121 and the third switching unit 131 can include a plurality of power semiconductor switches and these power semiconductor switches connect to each other in series.

In FIG. 1, for example, the power semiconductor switches S1-S12 can be IGBTs, GTO thyristors, IGCTs or other switching elements, people skilled in this art can flexibly choose the elements according to the design requirements.

The bus capacitor module 140 includes a first bus capacitor unit C3 and a second bus capacitor unit C4. A terminal of the first bus capacitor unit C3 connects to the positive terminal 141, another terminal of the first bus capacitor unit C3 connects to the neutral point 143; a terminal of the second bus capacitor unit C4 connects to the neutral point 143, and another terminal of the second bus capacitor unit C4 connects to the negative terminal 142.

Under operation, the first bus capacitor unit C3 and the second bus capacitor unit C4 can be connected a DC input power, and control on and off of the power semiconductor switches S1-S12 respectively by the PWM (Pulse With Modulation) signals, thereby allowing inverting function of the five-level converter 100 by outputting AC power from the AC terminal U.

Similarly, under operation, the AC terminal U receives an AC input power, and control on and off of the power semiconductor switches S1-S12 respectively by the PWM (Pulse With Modulation) signals, thereby allowing rectifying function of the five-level converter 100 by outputting DC from the first bus capacitor unit C3 and the second bus capacitor unit C4.

In other exemplary embodiments, the PFM (Pulse Frequency Modulation) signals or the PAM (Pulse Amplitude Modulation) signals can be chosen for respectively controlling on and off of the power semiconductor switches S1-S12, thereby allowing the operation of the five-level converter 100.

Figure 13:
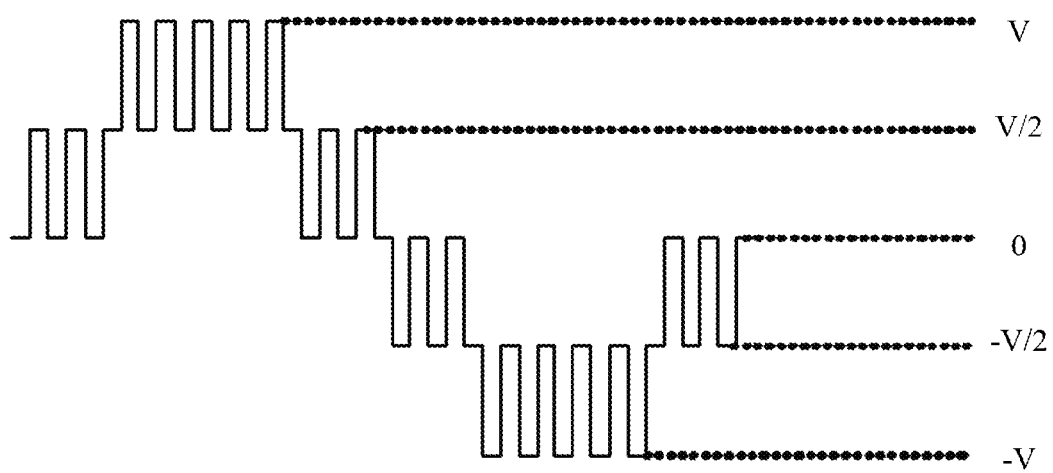
FIG. 13 is a diagram illustrating the voltage waveforms of the AC terminal U of the five-level converter according to the exemplary embodiments of the present disclosure.

For further describe the operations of the five-level converter 100, please refer to table 1, while in operation, a voltage on each of the power semiconductor switches is V/2, and the on-off states corresponding to each voltage on the AC terminal U are illustrated as table 1. In addition, the voltage waveforms of the AC terminal U of the five-level converter are illustrated in FIG. 13.

TABLE 1

|     | State 1 | State 2 | State 3 | State 4 | State 5 | State 6 | State 7 |
|-----|---------|---------|---------|---------|---------|---------|---------|
| S1  | ON      | ON      | OFF     | OFF     | OFF     | OFF     | OFF     |
| S2  | ON      | OFF     | ON      | OFF     | OFF     | OFF     | OFF     |
| S3  | ON      | OFF     | ON      | OFF     | OFF     | OFF     | OFF     |
| S4  | ON      | OFF     | ON      | OFF     | OFF     | OFF     | OFF     |
| S5  | OFF     | OFF     | OFF     | OFF     | OFF     | ON      | ON      |
| S6  | OFF     | OFF     | OFF     | OFF     | ON      | OFF     | ON      |
| S7  | OFF     | OFF     | OFF     | OFF     | ON      | OFF     | ON      |
| S8  | OFF     | OFF     | OFF     | OFF     | ON      | OFF     | ON      |
| S9  | ON      | ON      | ON      | ON      | ON      | OFF     | OFF     |
| S10 | OFF     | ON      | OFF     | ON      | ON      | ON      | ON      |
| S11 | ON      | ON      | ON      | ON      | OFF     | ON      | OFF     |
| S12 | OFF     | OFF     | ON      | ON      | ON      | ON      | ON      |
| U   | V       | V/2     | V/2     | 0       | −V/2    | −V/2    | −V      |

Table 1 illustrates an operation mode of the five-level converter 100, however, please note that the five-level converter 100 has many operation modes, table 1 is merely an exemplary embodiment. In addition, the applications of the five-level converter 100 are easily understood by people with ordinary skills in this art, and are not in the scope of the present disclosure, thereby further descriptions are omit for the sake of brevity.

Figure 2:
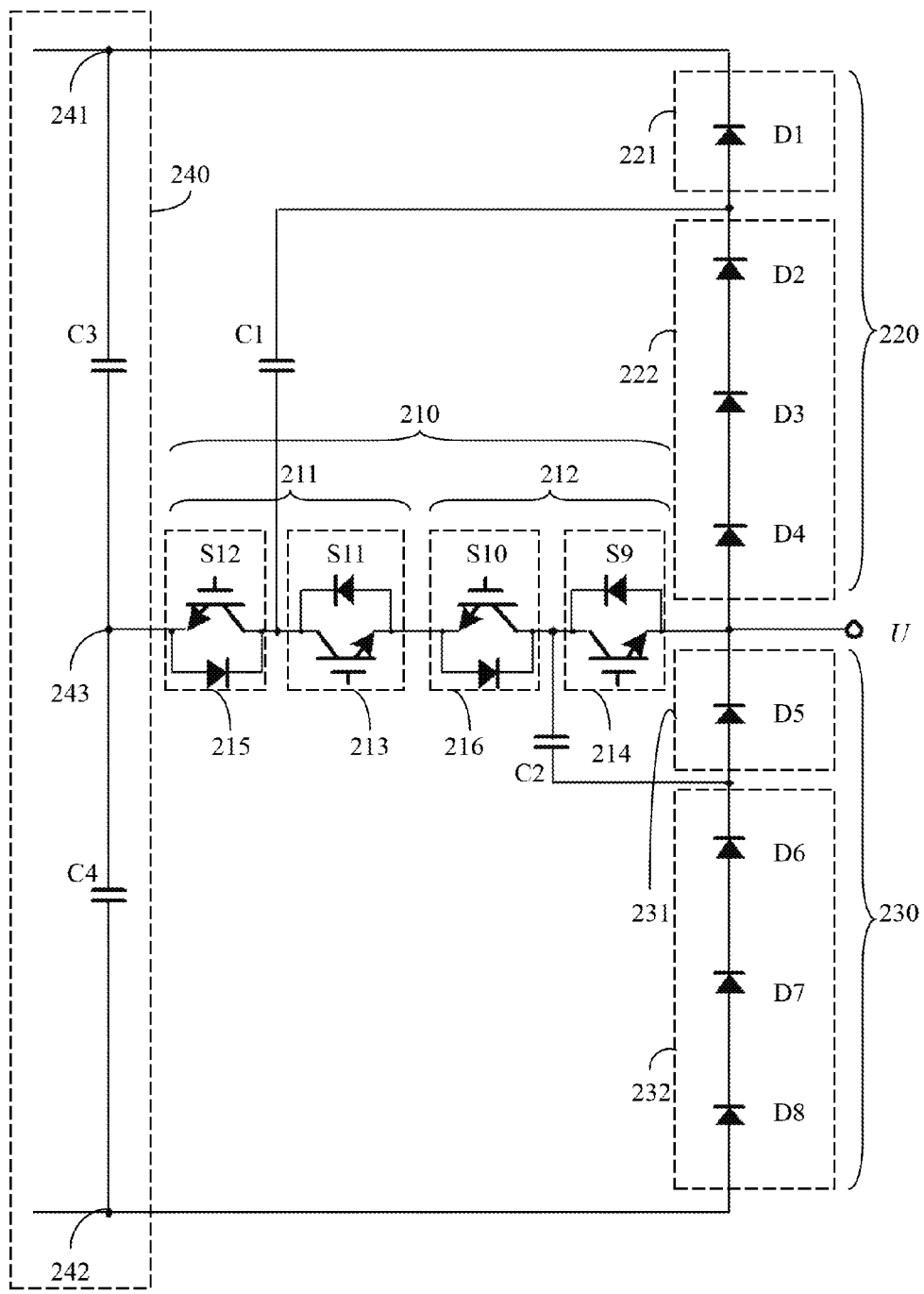
FIG. 2 is a diagram illustrating a circuit diagram of a five-level converting device according to a second exemplary embodiment of the present disclosure.

FIG. 2 is a diagram illustrating a circuit diagram of a five-level converting device (using single-phase as an example) according to a second exemplary embodiment of the present disclosure. The structure of the five-level rectifier 200 is similar to that of the five-level converter 100, the difference between the five-level rectifier 200 and the five-level converter 100 is that the power semiconductor switches S1-S8 in FIG. 1 are replaced by the diodes D1-D8. As shown in FIG. 2, the five-level rectifier 200 includes an AC terminal U, a first switch module 210, a second switch module 220, a third switch module 230, a first flying capacitor unit C1, a second flying capacitor unit C2 and a bus capacitor module 240.

In FIG. 2, the bus capacitor module 240 has a positive terminal 241, a negative terminal 242 and a neutral point 243. One of the two terminals of the first switch module 210 connects to the neutral point 243 of the bus capacitor module 240 and another terminal connects to the AC terminal U, wherein the first switch module 210 includes a first bidirectional switching circuit 211 and a second bidirectional switching circuit 212 cascaded to each other, the first bidirectional switching circuit 211 includes two first switching units 213 and 215 reversely connected in series, and the second bidirectional switching circuit 212 includes two first switching units 214 and 216 reversely connected in series.

One of the two terminals of the second switch module 220 connects to the positive terminal 241 of the bus capacitor module 240, and another terminal connects to the AC terminal U, wherein the second switch module 220 includes a plurality of second switching units 221 and 222 connected in series. One of the two terminals of the third switch module 230 connects to the negative terminal 242 of the bus capacitor module 240 and another terminal connects to the AC terminal U, wherein the third switch module 230 includes a plurality of third switching units 231 and 232 connected in series. The first flying capacitor unit C1 connects across the first switch module 210 and the second switch module 220, the second flying capacitor unit C2 connects across the first switch module 210 and the third switch module 230, wherein in the first switch module 210, the first switching units 213 and 215 only connect to the first flying capacitor unit C1 and do not connect to the second flying capacitor unit C2, and the first switching units 214 and 216 only connect to the second flying capacitor unit C2 and do not connect to the first flying capacitor unit C1.

The first bidirectional switching circuit 211 connects to the neutral point 243, the second bidirectional switching circuit 212 connects to the AC terminal U, a terminal of the first flying capacitor unit C1 connects to a connection point between two first switching units 213 and 215 in the first bidirectional switching circuit 211, and a terminal of the second flying capacitor unit C2 connects to a connection point between two first switching units 214 and 216 in the second bidirectional switching circuit 212, between the two connection points is an interval of the first switching units 213 and 216, thereby the two aforementioned connection points do not directly connect to each other. Another terminal of the first flying capacitor unit C1 connects to a connection point between the two second switching units 221 and 222, and another terminal of the second flying capacitor unit C2 connects to a connection point between the two third switching units 231 and 232.

In FIG. 2, each of the first switching units 214, 216, 213 and 215 includes a corresponding power semiconductor switch S9, S10, S11 or S12. The second switching unit 221 includes at least one power semiconductor switch for connecting to the positive terminal 241, in this exemplary embodiment, a single power semiconductor switch D1 is used as an example, and the second switching unit 222 includes at least one power semiconductor switch for connecting to the AC terminal U, herein three power semiconductor switches D2, D3, and D4 are used as an example, in which a voltage withstand character of each of the power semiconductor switches D1, D2, D3, and D4 are about the same. The third switching unit 231 includes at least one power semiconductor switch for connecting to the AC terminal U, in this exemplary embodiment a single power semiconductor switch D5 is used as an example, the third switching unit 232 includes at least one power semiconductor switch for connecting to the negative terminal 242, herein three power semiconductor switches D6, D7 and D8 are used as an example, in which voltage withstand characters of the power semiconductor switches D5, D6, D7, and D8 are about the same.

Please note that the amounts of the power semiconductor switches in each of the second switching units 221, 222 and of the third switching units 231, 232 in FIG. 2 are for the illustrative purposes only, and do not meant to be a limitation of the present disclosure, people skilled in this field can choose the amount of the power semiconductor switches and the corresponding withstanding voltage according to the design requirements. For example, the three power semiconductor switches D2, D3, and D4 connected in series can be integrate into a single power semiconductor switch, and the withstand voltage of that single power semiconductor switch is about the same as a sum of the withstand voltages of the power semiconductor switches D2, D3, and D4.

In FIG. 2, the power semiconductor switches D1-D8 are diodes, each of the power semiconductor switches S9-S12 includes a diode connected inside, and the power semiconductor switches and the corresponding diodes connected inside are reversely connected in parallel. For example, the power semiconductor switches S9-S12 can be IGBTs, GTO thyristors, IGCTs or other switching elements, people skilled in this art can flexibly choose the elements according to the design requirements.

The bus capacitor module 240 includes a first bus capacitor unit C3 and a second bus capacitor unit C4. A terminal of the first bus capacitor unit C3 connects to the positive terminal 241, and another terminal of the first bus capacitor unit C3 connects to the neutral point 243, another terminal of the second bus capacitor unit C4 connects to the negative terminal 242.

Under the operation, the AC terminal U receives an AC input power, and controls the on-off of the power semiconductor switches S9-S12 respectively by the PWM signals, to make the five-level rectifier 200 performing the rectifying function; thereby outputting DC power from the first bus capacitor unit C3 and the second bus capacitor unit C4. In other exemplary embodiments, the PFM signals or the PAM signals can be chosen for respectively controlling on-off of the power semiconductor switches S9-S12, thereby allowing the operation of the five-level converter 200.

For further describing the operations of the five-level converter 200, please refer to table 2, under the operation a voltage on each of the power semiconductor switches is V/2, and the on-off states corresponding to each voltage on the AC terminal U are illustrated as table 2. In addition, the voltage waveforms of the AC terminal U of the five-level converter are illustrated in FIG. 13.

TABLE 2

|     | State 1 | State 2 | State 3 | State 4 | State 5 | State 6 | State 7 |
| --- | --- | --- | --- | --- | --- | --- | --- |
| D1  | ON  | OFF | ON  | OFF | OFF | OFF | OFF |
| D2  | ON  | ON  | OFF | OFF | OFF | OFF | OFF |
| D3  | ON  | ON  | OFF | OFF | OFF | OFF | OFF |
| D4  | ON  | ON  | OFF | OFF | OFF | OFF | OFF |
| D5  | OFF | OFF | OFF | OFF | ON  | OFF | ON  |
| D6  | OFF | OFF | OFF | OFF | OFF | ON  | ON  |
| D7  | OFF | OFF | OFF | OFF | OFF | ON  | ON  |
| D8  | OFF | OFF | OFF | OFF | OFF | ON  | ON  |
| S9  | ON  | OFF | OFF | ON  | OFF | ON  | OFF |
| S10 | OFF | OFF | ON  | ON  | ON  | OFF | ON  |
| S11 | ON  | OFF | ON  | ON  | ON  | OFF | OFF |
| S12 | OFF | ON  | OFF | ON  | ON  | OFF | ON  |
| U   | V   | V/2 | V/2 | 0   | −V/2 | −V/2 | −V  |

Table 2 illustrates an operation mode of the five-level converter 200, however, please note that the five-level converter 200 has many operation modes, table 2 is merely an exemplary embodiment. In addition, the applications of the five-level converter 200 are easily understood by people with ordinary skills in this art, and are not in the scope of the present disclosure, thereby further descriptions are omit for the sake of brevity.

Figure 3:
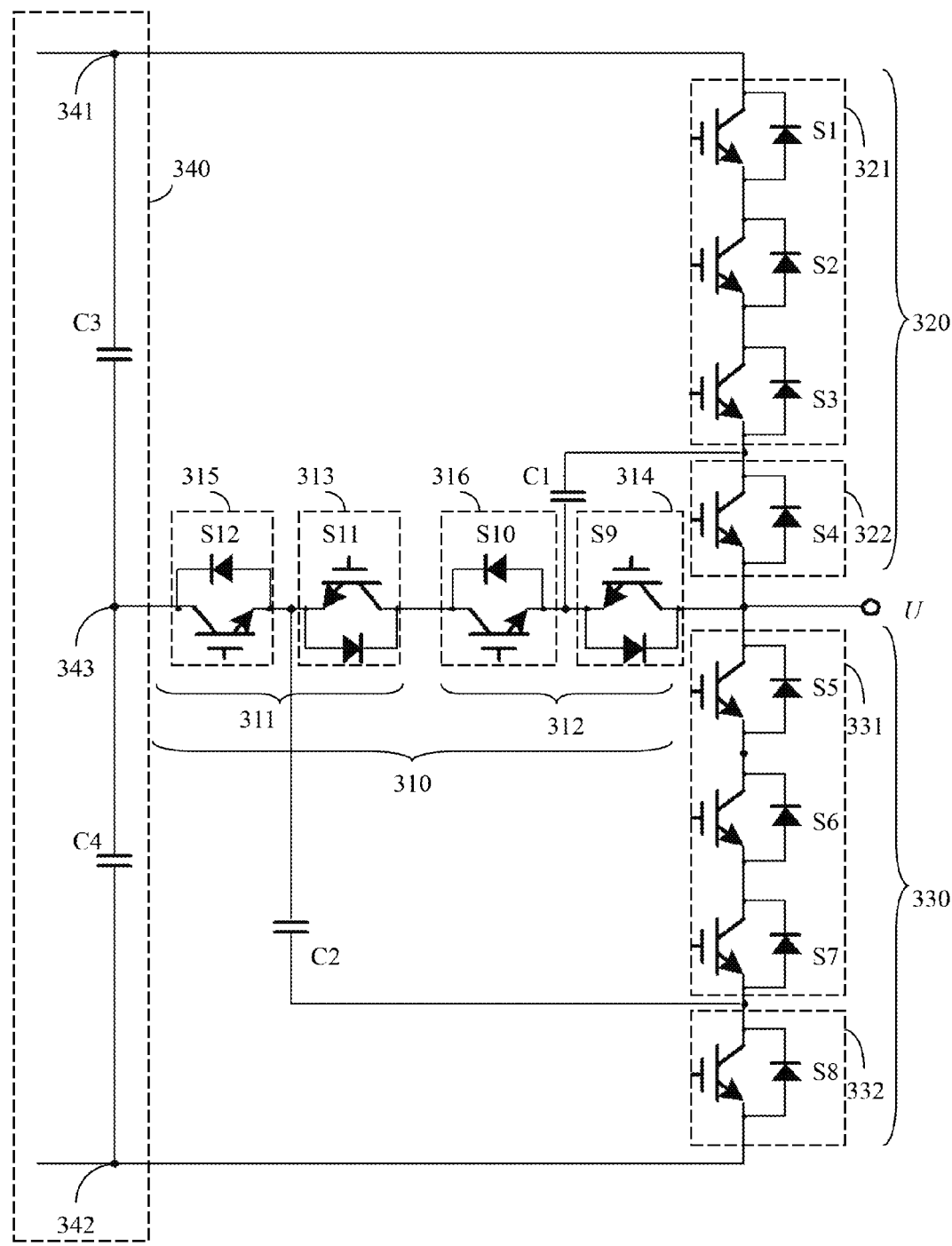
FIG. 3 is a diagram illustrating a circuit diagram of a five-level converting device according to a third exemplary embodiment of the present disclosure.

FIG. 3 is a diagram illustrating a circuit diagram of a five-level converting device (using single-phase as an example) according to a third exemplary embodiment of the present disclosure. The structure of the five-level rectifier 300 is similar to that of the five-level converter 100, the differences between the five-level rectifier 300 and the five-level converter 100 are that the connections of the first flying capacitor unit C1 and of the second flying capacitor unit C2, and the connections of the power semiconductor switches S9-S12. As shown in FIG. 3, the five-level converter 300 includes an AC terminal U, a first switch module 310, a second switch module 320, a third switch module 330, a first flying capacitor unit C1, a second flying capacitor unit C2 and a bus capacitor module 340.

As shown in FIG. 3, the bus capacitor module 340 has a positive terminal 341, a negative terminal 342 and a neutral point 343. One of the two terminals of the first switch module 310 connects to the neutral point 343 of the bus capacitor module 340 and another terminal connects to the AC terminal U, wherein the first switch module 310 includes a first bidirectional switching circuit 311 and a second bidirectional switching circuit 312 cascaded to each other, the first bidirectional switching circuit 311 includes two first switching units 313 and 315 reversely connected in series, and the second bidirectional switching circuit 312 includes two first switching units 314 and 316 reversely connected in series. One of the two terminals of the second switch module 320 connects to the positive terminal 341 of the bus capacitor module 340 and another terminal connects to the AC terminal U, wherein the second switch module 320 includes a plurality of second switching units 321 and 322 connected in series. One of the two terminals of the third switch module 330 connects to the negative terminal 342 of the bus capacitor module 340 and another terminal connects to the AC terminal U, wherein the third switch module 330 includes a plurality of third switching units 331 and 332 connected in series. The first flying capacitor unit C1 connects across the first switch module 310 and the second switch module 320, the second flying capacitor unit C2 connects across the first switch module 310 and the third switch module 330, wherein in the first switch module 310, the first switching units 313 and 315 only connect to the second flying capacitor unit C2 and do not connect to the first flying capacitor unit C1, and the first switching units 314 and 316 only connect to the first flying capacitor unit C1 and do not connect to the second flying capacitor unit C2.

The first bidirectional switching circuit 311 connects to the neutral point 343, the second bidirectional switching circuit 312 connects to the AC terminal U, a terminal of the second flying capacitor unit C2 connects to a connection point between two first switching units 313 and 315 in the first bidirectional switching circuit 311, and a terminal of the first flying capacitor unit C1 connects to a connection point between two first switching units 314 and 316 in the second bidirectional switching circuit 312, between the two connection points is an interval of the first switching units 313 and 316, thereby the two aforementioned connection points do not directly connect to each other. Another terminal of the first flying capacitor unit C1 connects to a connection point between the two second switching units 321 and 322, and another terminal of the second flying capacitor unit C2 connects to a connection point between the two third switching units 331 and 332.

In FIG. 3, each of the first switching units 314, 316, 313 and 315 includes a corresponding power semiconductor switch S9, S10, S11 or S12. A collector of the power semiconductor switch S9 connects to the AC terminal U, an emitter of the power semiconductor switch S9 connects to the emitter of the power semiconductor switch S10, the collector of the power semiconductor switch S10 connects to the collector of the power semiconductor switch S11, the emitter of the power semiconductor switch S11 connects to the emitter of the power semiconductor switch S12, and the collector of the power semiconductor switch S12 connects to the neutral point 343. Each of the power semiconductor switches S9-S12 includes a diode connected inside, and the power semiconductor switches and the corresponding diodes connected inside are reversely connected in parallel. For example, an anode of the diode connected inside of the power semiconductor switch S9 connects to the emitter of the power semiconductor switch S9, and a cathode of the diode connected inside of the power semiconductor switch S9 connects to the collector of the power semiconductor switch S9.

The second switching unit 321 includes at least one power semiconductor switch for connecting to the positive terminal 341. in this exemplary embodiment, three power semiconductor switches S1, S2 and S3 connected in series are used as an example, and the second switching unit 322 includes at least one power semiconductor switch for connecting to the AC terminal U, herein a single power semiconductor switch S4 is used as an example, in which voltage withstand characters of the power semiconductor switches S1, S2, S3, and S4 are about the same; the third switching unit 331 includes at least one power semiconductor switch for connecting to the AC terminal U, herein three power semiconductor switches S5, S6, and S7 are used as an example, the third switching unit 332 includes at least one power semiconductor switch for connecting to the negative terminal 342, herein a single power semiconductor switch S8 is used as an example, voltage withstand characters of the power semiconductor switches S5, S6, S7, and S8 are about the same.

Please note that the amounts of the power semiconductor switches in each of the second switching units 321, 322 and of the third switching units 331, 332 in FIG. 3 are for the illustrative purposes only, and do not meant to be a limitation of the present disclosure, people skilled in this field can choose the amount of the power semiconductor switches and the corresponding withstanding voltages according to the design requirements. For example, the three power semiconductor switches S1, S2, and S3 connected in series can be integrate into a single power semiconductor switch, and the withstand voltage of that single power semiconductor switch is about the same as a sum of the withstand voltages of the power semiconductor switches S1, S2, and S3; the three power semiconductor switches S5, S6, and S7 connected in series can also be integrate into a single power semiconductor switch, and the withstand voltage of that single power semiconductor switch is about the same as a sum of the withstand voltages of the power semiconductor switches S5, S6, and S7.

In FIG. 3, each of the power semiconductor switches S1-S12 includes a diode connected inside, and each of the power semiconductor switches and the corresponding diode connected inside are reversely connected in parallel. For example, the power semiconductor switches S1-S12 can be IGBTs, GTO thyristors, IGCTs or other switching elements, people skilled in this art can flexibly choose the elements according to the design requirements.

The bus capacitor module 340 includes a first bus capacitor unit C3 and a second bus capacitor unit C4. A terminal of the first bus capacitor unit C3 connects to the positive terminal 341m and another terminal of the first bus capacitor unit C3 connects to the neutral point 343; a terminal of the second bus capacitor unit C4 connects to the neutral point 343, and another terminal of the second bus capacitor unit C4 connects to the negative terminal 342.

Under operation, the first bus capacitor unit C3 and the second bus capacitor unit C4 can directly connect to an DC input power, and control the on-off of the power semiconductor switches S1-S12 respectively by the PWM signals, to make the five-level rectifier 300 performing the inverting function; thereby outputting AC power from the AC terminal U.

Similarly, under operation, the AC terminal U receives an AC input power, and controls the on-off of the power semiconductor switches S1-S12 respectively by the PWM signals, to make the five-level rectifier 300 performing the rectifying function; thereby outputting DC power from the first bus capacitor unit C3 and the second bus capacitor unit C4.

In other exemplary embodiments, the PFM signals or the PAM signals can be chosen for respectively controlling on-off of the power semiconductor switches S1-S12, thereby allowing the operation of the five-level converter 300.

For further describing the operations of the five-level converter 300, please refer to table 3, under the operation a voltage on each of the power semiconductor switches is V/2, and the on-off states corresponding to each voltage on the AC terminal U are illustrated as table 3. In addition, the voltage waveforms of the AC terminal U of the five-level converter are illustrated in FIG. 13.

TABLE 3

|  | State 1 | State 2 | State 3 | State 4 | State 5 | State 6 | State 7 |
|---|---|---|---|---|---|---|---|
| S1 | ON | ON | OFF | OFF | OFF | OFF | OFF |
| S2 | ON | ON | OFF | OFF | OFF | OFF | OFF |
| S3 | ON | ON | OFF | OFF | OFF | OFF | OFF |
| S4 | ON | OFF | ON | OFF | OFF | OFF | OFF |
| S5 | OFF | OFF | OFF | OFF | OFF | ON | ON |
| S6 | OFF | OFF | OFF | OFF | OFF | ON | ON |
| S7 | OFF | OFF | OFF | OFF | OFF | ON | ON |
| S8 | OFF | OFF | OFF | OFF | ON | OFF | ON |
| S9 | OFF | ON | OFF | ON | ON | ON | ON |
| S10 | ON | ON | ON | ON | ON | OFF | OFF |
| S11 | OFF | OFF | ON | ON | ON | ON | ON |
| S12 | ON | ON | ON | ON | OFF | ON | OFF |
| U | V | V/2 | V/2 | 0 | −V/2 | −V/2 | −V |

Table 3 illustrates an operation mode of the five-level converter 300, however, please note that the five-level converter 300 has many operation modes, table 3 is merely an exemplary embodiment. In addition, the applications of the five-level converter 300 are easily understood by people with ordinary skills in this art, and are not in the scope of the present disclosure, thereby further descriptions are omit for the sake of brevity.

Figure 4:
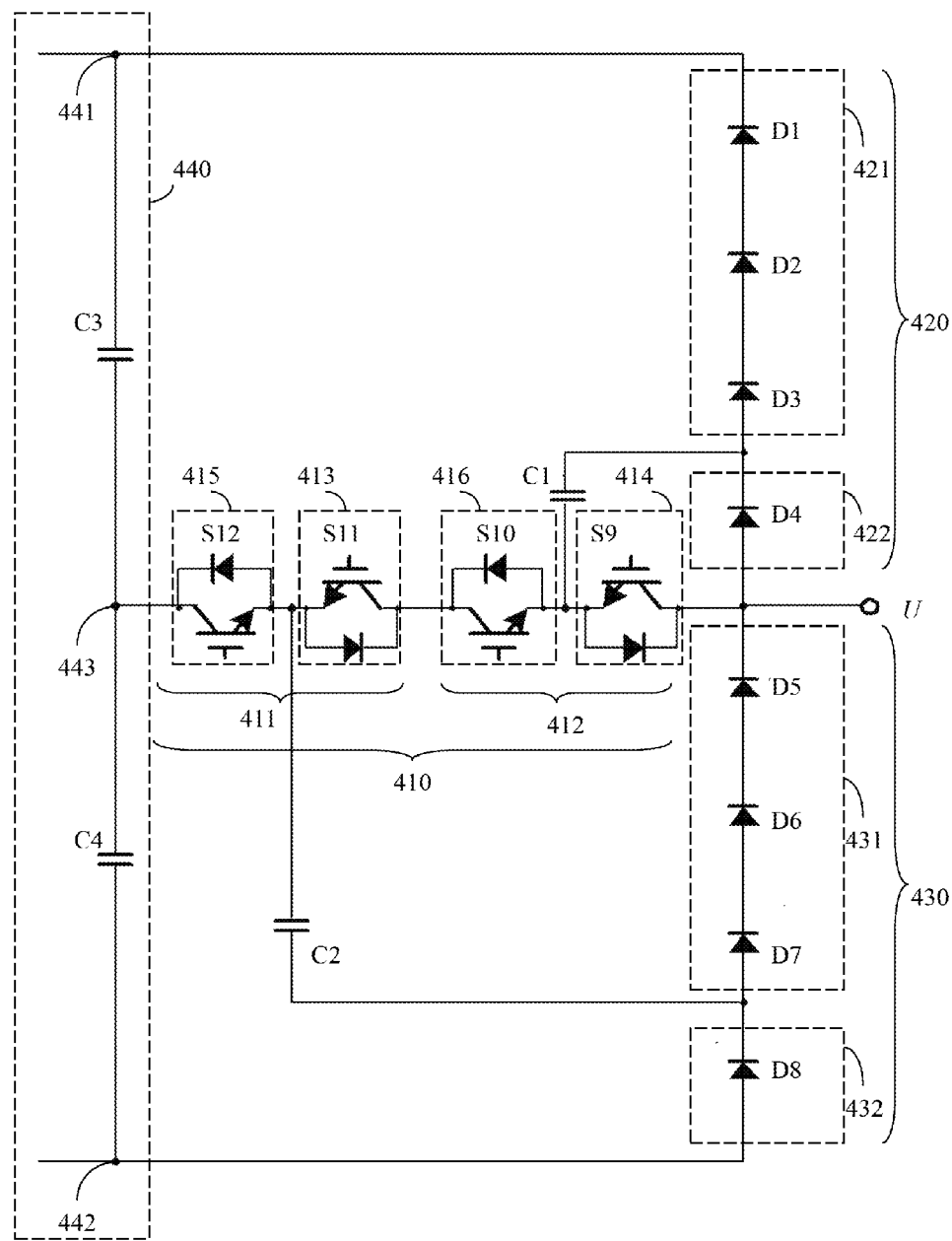
FIG. 4 is a diagram illustrating a circuit diagram of a five-level converting device according to a fourth exemplary embodiment of the present disclosure.

FIG. 4 is a diagram illustrating a circuit diagram of a five-level converting device (using single-phase as an example) according to a fourth exemplary embodiment of the present disclosure. The structure of the five-level rectifier 400 is similar to that of the five-level converter 300, the differences between the five-level rectifier 400 and the five-level converter 300 are the power semiconductor switches S1-S8 in FIG. 3 are replaced by the diodes D1-D8 in FIG. 4. As shown in FIG. 4, the five-level rectifier 400 includes an AC terminal U, a first switch module 410, a second switch module 420, a third switch module 430, a first flying capacitor unit C1, a second flying capacitor unit C2 and a bus capacitor module 440.

In FIG. 4, the bus capacitor module 440 has a positive terminal 441, a negative terminal 442 and a neutral point 443. One of the two terminals of the first switch module 410 connects to the neutral point 443 of the bus capacitor module 440 and the other terminal connects to the AC terminal U, wherein the first switch module 410 includes a first bidirectional switching circuit 411 and a second bidirectional switching circuit 412 cascaded to each other, the first bidirectional switching circuit 411 includes two first switching units 413 and 415 reversely connected in series, the second bidirectional switching circuit 412 includes two first switching units 414 and 416 reversely connected in series. One of the two terminals of the second switch module 420 connects to the positive terminal 441 of the bus capacitor module 440 and the other terminal connects to the AC terminal U, wherein the second switch module 420 includes a plurality of second switching units 421 and 422 connected in series. One of the two terminals of the third switch module 430 connects to the negative terminal 442 of the bus capacitor module 440 and the other terminal connects to the AC terminal U, wherein the third switch module 430 includes a plurality of third switching units 431 and 432 connected in series. The first flying capacitor unit C1 connects across the first switch module 410 and the second switch module 420, and the second flying capacitor unit C2 connects across the first switch module 410 and the third switch module 430, wherein in the first switch module 410, the first switching units 413 and 415 only connect to the second flying capacitor unit C2 and do not connect to the first flying capacitor unit C1, and the first switching units 414 and 416 only connect to the first flying capacitor unit C1 and do not connect to the second flying capacitor unit C2.

The first bidirectional switching circuit 411 connects to the neutral point 443, the second bidirectional switching circuit 412 connects to the AC terminal U, a terminal of the second flying capacitor unit C2 connects to a connection point between two first switching units 413 and 415 in the first bidirectional switching circuit 411, and a terminal of the first flying capacitor unit C1 connects to a connection point between two first switching units 414 and 416 in the second bidirectional switching circuit 412, between the two connection points is an interval of the first switching units 413 and 416, thereby the two aforementioned connection points do not directly connect to each other. Another terminal of the first flying capacitor unit C1 connects to a connection point between the two second switching units 421 and 422, and another terminal of the second flying capacitor unit C2 connects to a connection point between the two third switching units 431 and 432.

In FIG. 4, each of the first switching units 414, 416, 413 and 415 includes a corresponding power semiconductor switch S9, S10, S11 or S12. The second switching unit 421 includes at least one power semiconductor switch for connecting to the positive terminal 441, in this exemplary embodiment, three power semiconductor switches D1, D2, and D3 connected in series are used as an example, and the second switching unit 422 includes at least one power semiconductor switch for connecting to the AC terminal U, herein a single power semiconductor switch D4 is used as an example, in which voltage withstand characters of the power semiconductor switches D1, D2, D3, and D4 are about the same; the third switching unit 431 includes at least one power semiconductor switch for connecting to the AC terminal U, in this exemplary embodiment three power semiconductor switches D5, D6, and D7 connected in series are used as an example, and the third switching unit 432 includes at least one power semiconductor switch for connecting to the negative terminal 442, herein a single power semiconductor switch D8 is used as an example, in which voltage withstand characters of the power semiconductor switches D5, D6, D7, and D8 are about the same.

Please note that the amounts of the power semiconductor switches in each of the second switching units 421, 422 and of the third switching units 431, 432 in FIG. 4 are for the illustrative purposes only, and do not meant to be a limitation of the present disclosure, people skilled in this field can choose the amount of the power semiconductor switches and the corresponding withstanding voltages according to the design requirements. For example, the three power semiconductor switches D1, D2, and D3 connected in series can be integrate into a single power semiconductor switch, and the withstand voltage of that single power semiconductor switch is about the same as a sum of the withstand voltages of the power semiconductor switches D1, D2, and D3; the three power semiconductor switches D5, D6, and D7 connected in series can also be integrate into a single power semiconductor switch, and the withstand voltage of that single power semiconductor switch is about the same as a sum of the withstand voltages of the power semiconductor switches D5, D6, and D7.

In FIG. 4, the power semiconductor switches D1-D8 are diodes, and each of the power semiconductor switches S9-S12 includes a diode connected inside, and each of the power semiconductor switches and the corresponding diode connected inside are reversely connected in parallel. For example, the power semiconductor switches S9-S12 can be IGCTs, GTO thyristors, IGCTs or other switching elements, people skilled in this art can flexibly choose the elements according to the design requirements.

The bus capacitor module 440 includes a first bus capacitor unit C3 and a second bus capacitor unit C4. A terminal of the first bus capacitor unit C3 connects to the positive terminal 441, and the other terminal of the first bus capacitor unit C3 connects to the neutral point 443; a terminal of the second bus capacitor unit C4 connects to the neutral point 443, and the other terminal of the second bus capacitor unit C4 connects to the negative terminal 442.

Under operation, the AC terminal U receives the AC input power, and controls the on-off of the power semiconductor switches S9-S12 respectively by the PWM signals, to make the five-level rectifier 400 performing the rectifying function, thereby outputting DC power from the first bus capacitor unit C3 and the second bus capacitor unit C4. In other exemplary embodiments, the PFM signals or the PAM signals can be chosen for respectively controlling on-off of the power semiconductor switches S9-S12, thereby allowing the operation of the five-level converter 400.

For further describing the operations of the five-level converter 400, please refer to table 4, under the operation a voltage on each of the power semiconductor switches is V/2, and the on-off states corresponding to each voltage on the AC terminal U are illustrated as table 4. In addition, the voltage waveforms of the AC terminal U of the five-level converter are illustrated in FIG. 13.

TABLE 4

|     | State 1 | State 2 | State 3 | State 4 | State 5 | State 6 | State 7 |
| --- | --- | --- | --- | --- | --- | --- | --- |
| D1 | ON | OFF | ON | OFF | OFF | OFF | OFF |
| D2 | ON | OFF | ON | OFF | OFF | OFF | OFF |
| D3 | ON | OFF | ON | OFF | OFF | OFF | OFF |
| D4 | ON | ON | OFF | OFF | OFF | OFF | OFF |
| D5 | OFF | OFF | OFF | OFF | ON | OFF | ON |
| D6 | OFF | OFF | OFF | OFF | ON | OFF | ON |
| D7 | OFF | OFF | OFF | OFF | ON | OFF | ON |
| D8 | OFF | OFF | OFF | OFF | OFF | ON | ON |
| S9 | OFF | OFF | ON | ON | ON | ON | ON |
| S10 | ON | ON | ON | ON | OFF | ON | OFF |
| S11 | OFF | ON | OFF | ON | ON | ON | ON |
| S12 | ON | ON | ON | ON | ON | OFF | OFF |
| U | V | V/2 | V/2 | 0 | −V/2 | −V/2 | −V |

Table 4 illustrates an operation mode of the five-level converter 400, however, please note that the five-level converter 400 has many operation modes, table 4 is merely an exemplary embodiment. In addition, the applications of the five-level converter 400 are easily understood by people with ordinary skills in this art, and are not in the scope of the present disclosure, thereby further descriptions are omit for the sake of brevity.

Figure 5:
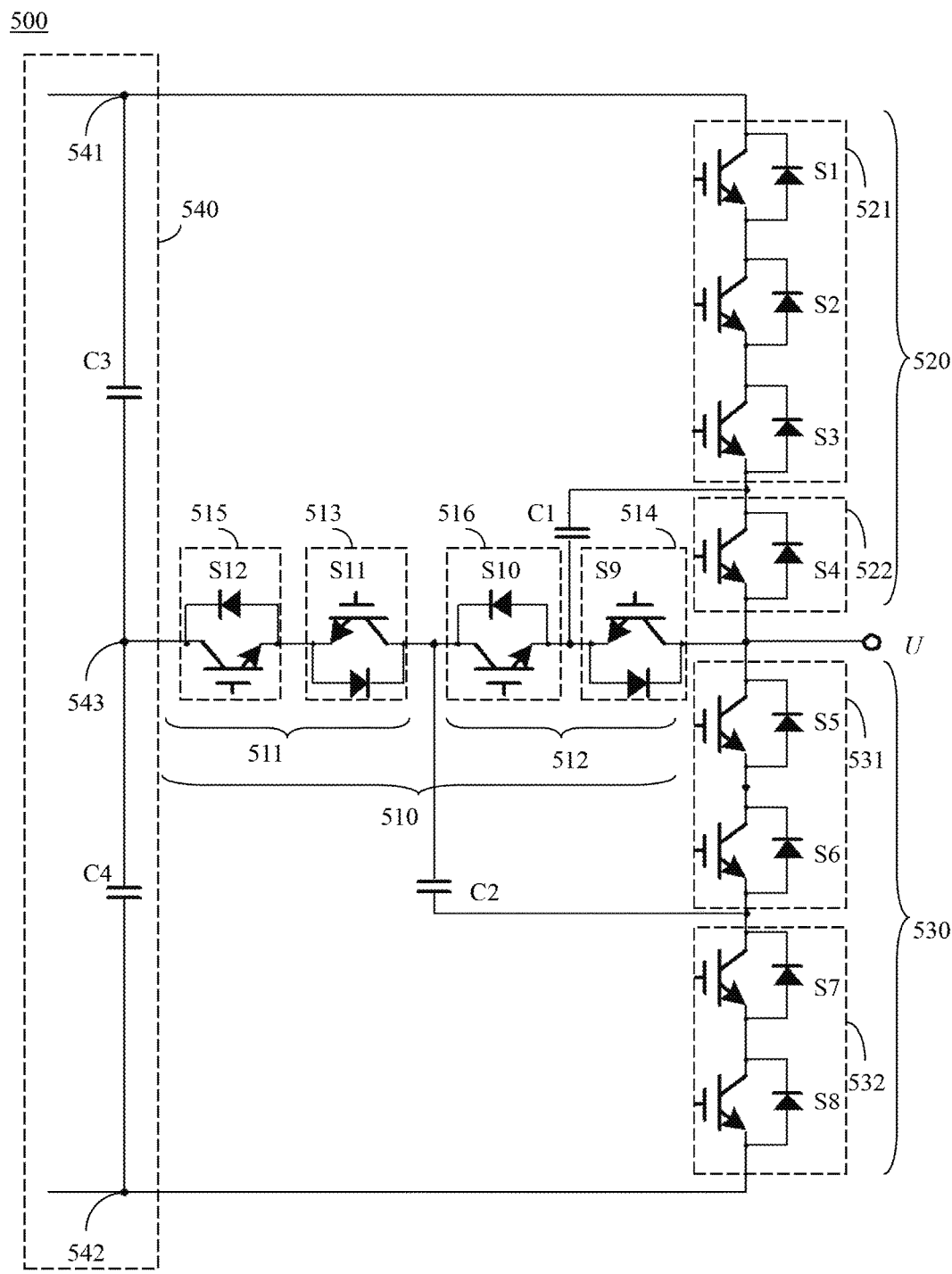
FIG. 5 is a diagram illustrating a circuit diagram of a five-level converting device according to a fifth exemplary embodiment of the present disclosure.

FIG. 5 is a diagram illustrating a circuit diagram of a five-level converting device (using single-phase as an example) according to a fifth exemplary embodiment of the present disclosure. The structure of the five-level rectifier 500 is similar to that of the five-level converter 300, the difference between the five-level rectifier 500 and the five-level converter 300 is the connections of the second flying capacitor unit C2. As shown in FIG. 5, the five-level converter 500 includes an AC terminal U, a first switch module 510, a second switch module 520, a third switch module 530, a first flying capacitor unit C1, a second flying capacitor unit C2 and a bus capacitor module 540.

In FIG. 5, the bus capacitor module 540 has a positive terminal 541, a negative terminal 542 and a neutral point 543. One of the two terminals of the first switch module 510 connects to the neutral point 543 of the bus capacitor module 540 and the other terminal connects to the AC terminal U, wherein the first switch module 510 includes a first bidirectional switching circuit 511 and a second bidirectional switching circuit 512 cascaded to each other, the first bidirectional switching circuit 511 includes two first switching units 513 and 515 reversely connected in series, the second bidirectional switching circuit 512 includes two first switching units 514 and 516 reversely connected in series. One of the two terminals of the second switch module 520 connects to the positive terminal 541 of the bus capacitor module 540 and the other terminal connects to the AC terminal U, wherein the second switch module 520 includes a plurality of second switching units 521 and 522 connected in series. One of the two terminals of the third switch module 530 connects to the negative terminal 542 of the bus capacitor module 540, and the other terminal connects to the AC terminal U, wherein the third switch module 530 includes a plurality of third switching units 531 and 532 connected in series. The first flying capacitor unit C1 connects across the first switch module 510 and the second switch module 520, and the second flying capacitor unit C2 connects across the first switch module 510 and the third switch module 530, wherein in the first switch module 510, the first switching units 513 and 516 connect to the second flying capacitor unit C2, and the first switching units 514 and 516 connects to the first flying capacitor unit C1.

The first bidirectional switching circuit 511 connects to the neutral point 543, the second bidirectional switching circuit 512 connects to the AC terminal U, a terminal of the second flying capacitor unit C2 connects to a connection point between the first bidirectional switching circuit 511 and the second bidirectional switching circuit 512, a terminal of the first flying capacitor unit C1 connects to a connection point between two first switching units 514 and 516 in the second bidirectional switching circuit 512, and between the two connection points is an interval of the first switching unit 516, thereby the two aforementioned connection points do not directly connect to each other. Another terminal of the first flying capacitor unit C1 connects to a connection point between the two second switching units 521 and 522, and another terminal of the second flying capacitor unit C2 connects to a connection point between the two third switching units 531 and 532.

In FIG. 5, each of the first switching units 514, 516, 513 and 515 includes a corresponding power semiconductor switches S9, S10, S11, or S12. The second switching unit 521 includes at least one power semiconductor switch for connecting to the positive terminal 541, in this exemplary embodiment, three power semiconductor switches S1, S2, and S3 connected in series are used as an example, and the second switching unit 522 includes at least one power semiconductor switch for connecting to the AC terminal U, herein a single power semiconductor switch S4 is used as an example, in which voltage withstand characters of the power semiconductor switches S1, S2, S3, and S4 are about the same; the third switching unit 531 includes at least one power semiconductor switch for connecting to the AC terminal U, in this exemplary embodiment two power semiconductor switches S5 and S6 connected in series are used as an example, and the third switching unit 532 includes at least one power semiconductor switch for connecting to the negative terminal 542, herein two power semiconductor switches S7 and S8 connected in series are used as an example, in which voltage withstand characters of the power semiconductor switches S5, S6, S7, and S8 are about the same.

Please note that the amounts of the power semiconductor switches in each of the second switching units 521, 522 and of the third switching units 531, 532 in FIG. 5 are for the illustrative purposes only, and do not meant to be a limitation of the present disclosure, people skilled in this field can choose the amount of the power semiconductor switches and the corresponding withstanding voltages according to the design requirements. For example, the three power semiconductor switches S1, S2, and S3 connected in series can be integrate into a single power semiconductor switch, and the withstand voltage of that single power semiconductor switch is about the same as a sum of the withstand voltages of the power semiconductor switches S1, S2, and S3; the two power semiconductor switches S5 and S6 connected in series can also be integrate into a single power semiconductor switch, and the withstand voltage of that single power semiconductor switch is about the same as a sum of the withstand voltages of the power semiconductor switches S5 and S6; besides, the two power semiconductor switches S7 and S8 connected in series can also be integrate into a single power semiconductor switch, and the withstand voltage of that single power semiconductor switch is about the same as a sum of the withstand voltages of the power semiconductor switches S7 and S8.

In FIG. 5, each of the power semiconductor switches S1-S12 includes a diode connected inside, and each of the power semiconductor switches and the corresponding diode connected inside are reversely connected in parallel. For example, the power semiconductor switches S1-S12 can be IGBTs, GTO thyristors, IGCTs or other switching elements, people skilled in this art can flexibly choose the elements according to the design requirements.

The bus capacitor module 540 includes a first bus capacitor unit C3 and a second bus capacitor unit C4. A terminal of the first bus capacitor unit C3 connects to the positive terminal 541, and the other terminals of the first bus capacitor unit C3 connects to the neutral point 543; a terminal of the second bus capacitor unit C4 connects to the neutral point 543, and the other terminal of the second bus capacitor unit C4 connects to the negative terminal 542.

Under operation, the first bus capacitor unit C3 and the second bus capacitor unit C4 can receives the DC input power, and control the on-off of the power semiconductor switches S1-S12 respectively by the PWM signals, to make the five-level rectifier 500 performing the inverting function, thereby outputting AC power from the AC terminal U.

Similarly, under operation, the AC terminal U receives the AC input power, and controls the on-off of the power semiconductor switches S1-S12 respectively by the PWM signals, to make the five-level rectifier 500 performing the rectifying function, thereby outputting DC power from the first bus capacitor unit C3 and the second bus capacitor unit C4.

In other exemplary embodiments, the PFM signals or the PAM signals can be chosen for respectively controlling on-off of the power semiconductor switches S1-S12, thereby allowing the operation of the five-level converter 500.

For further describing the operations of the five-level converter 500, please refer to table 5, under the operation a voltage on each of the power semiconductor switches is V/2, and the on-off states corresponding to each voltage on the AC terminal U are illustrated as table 5. In addition, the voltage waveforms of the AC terminal U of the five-level converter are illustrated in FIG. 13.

TABLE 5

|     | State 1 | State 2 | State 3 | State 4 | State 5 | State 6 | State 7 |
| --- | --- | --- | --- | --- | --- | --- | --- |
| S1  | ON  | ON  | OFF | OFF | OFF | OFF | OFF |
| S2  | ON  | ON  | OFF | OFF | OFF | OFF | OFF |
| S3  | ON  | ON  | OFF | OFF | OFF | OFF | OFF |
| S4  | ON  | OFF | ON  | OFF | OFF | OFF | OFF |
| S5  | OFF | OFF | OFF | OFF | OFF | ON  | ON  |
| S6  | OFF | OFF | OFF | OFF | OFF | ON  | ON  |
| S7  | OFF | OFF | OFF | OFF | ON  | OFF | ON  |
| S8  | OFF | OFF | OFF | OFF | ON  | OFF | ON  |
| S9  | OFF | ON  | OFF | ON  | ON  | ON  | ON  |
| S10 | ON  | ON  | ON  | ON  | ON  | OFF | OFF |
| S11 | OFF | OFF | ON  | ON  | ON  | ON  | ON  |
| S12 | ON  | ON  | ON  | ON  | OFF | ON  | OFF |
| U   | V   | V/2 | V/2 | 0   | −V/2 | −V/2 | −V  |

Table 5 illustrates an operation mode of the five-level converter 500, however, please note that the five-level converter 500 has many operation modes, table 5 is merely an exemplary embodiment. In addition, the applications of the five-level converter 500 are easily understood by people with ordinary skills in this art, and are not in the scope of the present disclosure, thereby further descriptions are omit for the sake of brevity.

Figure 6:
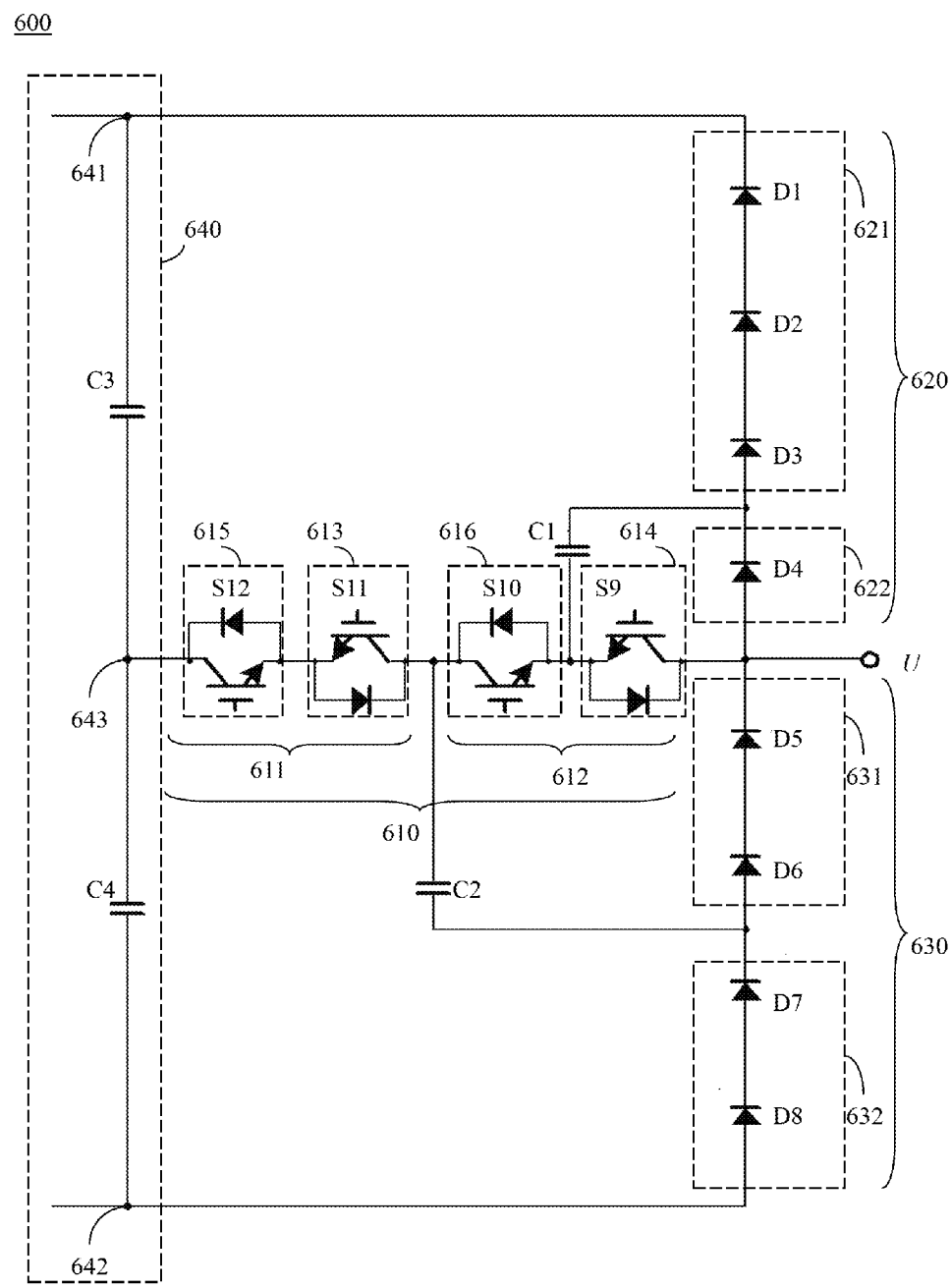
FIG. 6 is a diagram illustrating a circuit diagram of a five-level converting device according to a sixth exemplary embodiment of the present disclosure.

FIG. 6 is a diagram illustrating a circuit diagram of a five-level converting device according to a sixth exemplary embodiment of the present disclosure. The structure of the five-level rectifier 600 is similar to that of the five-level converter 500, the difference between the five-level rectifier 600 and the five-level converter 500 is the power semiconductor switches S1-S8 in FIG. 5 are replaced by the diodes D1-D8 in FIG. 6. As shown in FIG. 6, the five-level rectifier 600 includes an AC terminal U, a first switch module 610, a second switch module 620, a third switch module 630, a first flying capacitor unit C1, a second flying capacitor unit C2 and a bus capacitor module 640.

In FIG. 6, the bus capacitor module 640 has a positive terminal 641 a negative terminal 642 and a neutral point 643.

One of the two terminals of the first switch module 610 connects to the neutral point 643 of the bus capacitor module 640 and the other terminal connects to the AC terminal U, wherein the first switch module 610 includes a first bidirectional switching circuit 611 and a second bidirectional switching circuit 612 cascaded to each other, the first bidirectional switching circuit 611 includes two first switching units 613 and 615 reversely connected in series, the second bidirectional switching circuit 612 includes two first switching units 614 and 616 reversely connected in series. One of the two terminals of the second switch module 620 connects to the positive terminal 641 of the bus capacitor module 640 and the other terminal connects to the AC terminal U, wherein the second switch module 620 includes a plurality of second switching units 621 and 622 connected in series. One of the two terminals of the third switch module 630 connects to the negative terminal 642 of the bus capacitor module 640, and the other terminal connects to the AC terminal U, wherein the third switch module 630 includes a plurality of third switching units 631 and 632 connected in series. The first flying capacitor unit C1 connects across the first switch module 610 and the second switch module 620, and the second flying capacitor unit C2 connects across the first switch module 610 and the third switch module 630, wherein in the first switch module 610, the first switching units 613 and 616 connect to the second flying capacitor unit C2, and the first switching units 614 and 616 connects to the first flying capacitor unit C1.

The first bidirectional switching circuit 611 connects to the neutral point 643, the second bidirectional switching circuit 612 connects to the AC terminal U, a terminal of the second flying capacitor unit C2 connects to a connection point between the first bidirectional switching circuit 611 and the second bidirectional switching circuit 612, a terminal of the first flying capacitor unit C1 connects to a connection point between two first switching units 614 and 616 in the second bidirectional switching circuit 612, and between the two connection points is an interval of the first switching unit 616, thereby the two aforementioned connection points do not directly connect to each other. Another terminal of the first flying capacitor unit C1 connects to a connection point between the two second switching units 621 and 622, and another terminal of the second flying capacitor unit C2 connects to a connection point between the two third switching units 631 and 632.

In FIG. 6, each of the first switching units 614, 616, 613 and 615 includes a corresponding power semiconductor switches S9, S10, S11, or S12. The second switching unit 621 includes at least one power semiconductor switch for connecting to the positive terminal 641, in this exemplary embodiment, three power semiconductor switches D1, D2, and D3 connected in series are used as an example, and the second switching unit 622 includes at least one power semiconductor switch for connecting to the AC terminal U, herein a single power semiconductor switch D4 is used as an example, in which voltage withstand characters of the power semiconductor switches D1, D2, D3 and D4 are about the same; the third switching unit 631 includes at least one power semiconductor switch for connecting to the AC terminal U, in this exemplary embodiment two power semiconductor switches D5 and D6 connected in series are used as an example, and the third switching unit 632 includes at least one power semiconductor switch for connecting to the negative terminal 642, herein two power semiconductor switches D7 and D8 connected in series are used as an example, in which voltage withstand characters of the power semiconductor switches D5, D6, D7, and D8 are about the same.

Please note that the amounts of the power semiconductor switches in each of the second switching units 621, 622 and of the third switching units 631, 632 in FIG. 6 are for the illustrative purposes only, and do not meant to be a limitation of the present disclosure, people skilled in this field can choose the amount of the power semiconductor switches and the corresponding withstanding voltages according to the design requirements. For example, the three power semiconductor switches D1, D2, and D3 connected in series can be integrate into a single power semiconductor switch, and the withstand voltage of that single power semiconductor switch is about the same as a sum of the withstand voltages of the power semiconductor switches D1, D2, and D3; the two power semiconductor switches D5 and D6 connected in series can also be integrate into a single power semiconductor switch, and the withstand voltage of that single power semiconductor switch is about the same as a sum of the withstand voltages of the power semiconductor switches D5 and D6; besides, the two power semiconductor switches D7 and D8 connected in series can also be integrate into a single power semiconductor switch, and the withstand voltage of that single power semiconductor switch is about the same as a sum of the withstand voltages of the power semiconductor switches D7 and D8.

In FIG. 6, the power semiconductor switches D1-D8 are diodes, and each of the power semiconductor switches S9-S12 includes a diode connected inside, and each of the power semiconductor switches S9-S12 and the corresponding diode connected inside are reversely connected in parallel. For example, the power semiconductor switches S9-S12 can be IGBTs, GTO thyristors, IGCTs or other switching elements, people skilled in this art can flexibly choose the elements according to the design requirements.

The bus capacitor module 640 includes a first bus capacitor unit C3 and a second bus capacitor unit C4. A terminal of the first bus capacitor unit C3 connects to the positive terminal 641, and the other terminals of the first bus capacitor unit C3 connects to the neutral point 643; a terminal of the second bus capacitor unit C4 connects to the neutral point 643, and the other terminal of the second bus capacitor unit C4 connects to the negative terminal 642.

Under operation, the AC terminal U receives the AC input power, and controls the on-off of the power semiconductor switches S9-S12 respectively by the PWM signals, to make the five-level rectifier 600 performing the rectifying function, thereby outputting DC power from the first bus capacitor unit C3 and the second bus capacitor unit C4.

For further describing the operations of the five-level converter 600, please refer to table 6, under the operation a voltage on each of the power semiconductor switches is V/2, and the on-off states corresponding to each voltage on the AC terminal U are illustrated as table 6. In addition, the voltage waveforms of the AC terminal U of the five-level converter are illustrated in FIG. 13.

TABLE 6

|    | State 1 | State 2 | State 3 | State 4 | State 5 | State 6 | State 7 |
|----|---------|---------|---------|---------|---------|---------|---------|
| D1 | ON      | OFF     | ON      | OFF     | OFF     | OFF     | OFF     |
| D2 | ON      | OFF     | ON      | OFF     | OFF     | OFF     | OFF     |
| D3 | ON      | OFF     | ON      | OFF     | OFF     | OFF     | OFF     |
| D4 | ON      | ON      | OFF     | OFF     | OFF     | OFF     | OFF     |
| D5 | OFF     | OFF     | OFF     | OFF     | ON      | OFF     | ON      |

TABLE 6-continued

|  | State 1 | State 2 | State 3 | State 4 | State 5 | State 6 | State 7 |
|---|---|---|---|---|---|---|---|
| D6 | OFF | OFF | OFF | OFF | ON | OFF | ON |
| D7 | OFF | OFF | OFF | OFF | OFF | ON | ON |
| D8 | OFF | OFF | OFF | OFF | OFF | ON | ON |
| S9 | OFF | OFF | ON | ON | ON | ON | ON |
| S10 | ON | ON | ON | ON | OFF | ON | OFF |
| S11 | OFF | ON | OFF | ON | ON | ON | ON |
| S12 | ON | ON | ON | ON | ON | OFF | OFF |
| U | V | V/2 | V/2 | 0 | −V/2 | −V/2 | −V |

Table 6 illustrates an operation mode of the five-level converter 600, however, please note that the five-level converter 600 has many operation modes, table 6 is merely an exemplary embodiment. In addition, the applications of the five-level converter 600 are easily understood by people with ordinary skills in this art, and are not in the scope of the present disclosure, thereby further descriptions are omit for the sake of brevity.

Figure 7:
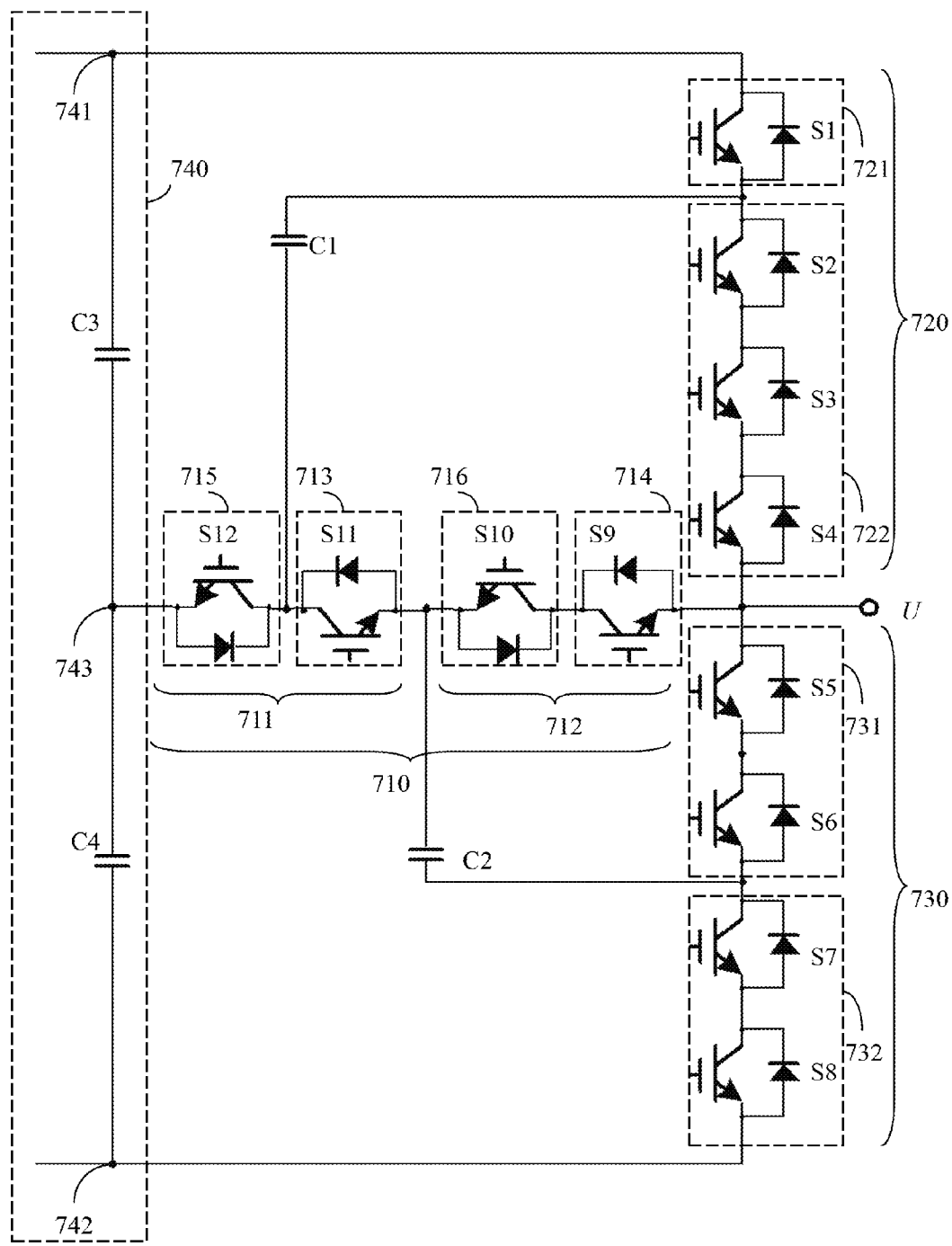
FIG. 7 is a diagram illustrating a circuit diagram of a five-level converting device according to a seventh exemplary embodiment of the present disclosure.

FIG. 7 is a diagram illustrating a circuit diagram of a five-level converting device (using single-phase as an example) according to a seventh exemplary embodiment of the present disclosure. The structure of the five-level rectifier 700 is similar to that of the five-level converter 100, the difference between the five-level rectifier 700 and the five-level converter 100 is the connections of the second flying capacitor unit C2. As shown in FIG. 7, the five-level converter 700 includes an AC terminal U, a first switch module 710, a second switch module 720, a third switch module 730, a first flying capacitor unit C1, a second flying capacitor unit C2 and a bus capacitor module 740.

In FIG. 7, the bus capacitor module 740 has a positive terminal 741, a negative terminal 742 and a neutral point 743. One of the two terminals of the first switch module 710 connects to the neutral point 743 of the bus capacitor module 740 and the other terminal connects to the AC terminal U, wherein the first switch module 710 includes a first bidirectional switching circuit 711 and a second bidirectional switching circuit 712 cascaded to each other, the first bidirectional switching circuit 711 includes two first switching units 713 and 715 reversely connected in series, the second bidirectional switching circuit 712 includes two first switching units 714 and 716 reversely connected in series. One of the two terminals of the second switch module 720 connects to the positive terminal 741 of the bus capacitor module 740 and the other terminal connects to the AC terminal U, wherein the second switch module 720 includes a plurality of second switching units 721 and 722 connected in series. One of the two terminals of the third switch module 730 connects to the negative terminal 742 of the bus capacitor module 740, and the other terminal connects to the AC terminal U, wherein the third switch module 730 includes a plurality of third switching units 731 and 732 connected in series. The first flying capacitor unit C1 connects across the first switch module 710 and the second switch module 720, and the second flying capacitor unit C2 connects across the first switch module 710 and the third switch module 730, wherein in the first switch module 710, the first switching units 713 and 716 connects to the second flying capacitor unit C2, and the first switching units 713 and 715 connects to the first flying capacitor unit C1.

The first bidirectional switching circuit 711 connects to the neutral point 743, the second bidirectional switching circuit 712 connects to the AC terminal U, a terminal of the second flying capacitor unit C2 connects to a connection point between the first bidirectional switching circuit 711 and the second bidirectional switching circuit 712, a terminal of the first flying capacitor unit C1 connects to a connection point between two first switching units 713 and 715 in the first bidirectional switching circuit 711; between the two connection points is an interval of the first switching unit 713, thereby the two aforementioned connection points do not directly connect to each other. Another terminal of the first flying capacitor unit C1 connects to a connection point between the two second switching units 721 and 722, and another terminal of the second flying capacitor unit C2 connects to a connection point between the two third switching units 731 and 732.

In FIG. 7, each of the first switching units 714, 716, 713 and 715 includes a corresponding power semiconductor switches S9, S10, S11, or S12. The second switching unit 721 includes at least one power semiconductor switch for connecting to the positive terminal 741, in this exemplary embodiment, a single power semiconductor switch S1 is used as an example, and the second switching unit 722 includes at least one power semiconductor switch for connecting to the AC terminal U, herein three power semiconductor switches S2, S3 and S4 are used as an example, in which voltage withstand characters of the power semiconductor switches S1, S2, S3 and S4 are about the same; the third switching unit 731 includes at least one power semiconductor switch for connecting to the AC terminal U, in this exemplary embodiment two power semiconductor switches S5 and S6 connected in series are used as an example, and the third switching unit 732 includes at least one power semiconductor switch for connecting to the negative terminal 742, herein the two power semiconductor switches S7 and S8 connected in series are used as an example, in which voltage withstand characters of the power semiconductor switches S5, S6, S7, and S8 are about the same.

Please note that the amounts of the power semiconductor switches in each of the second switching units 721, 722 and of the third switching units 731, 732 in FIG. 7 are for the illustrative purposes only, and do not meant to be a limitation of the present disclosure, people skilled in this field can choose the amount of the power semiconductor switches and the corresponding withstanding voltages according to the design requirements. For example, the three power semiconductor switches S2, S3, and S4 connected in series can be integrate into a single power semiconductor switch, and the withstand voltage of that single power semiconductor switch is about the same as a sum of the withstand voltages of the power semiconductor switches S2, S3, and S4; the two power semiconductor switches S5 and S6 connected in series can also be integrate into a single power semiconductor switch, and the withstand voltage of that single power semiconductor switch is about the same as a sum of the withstand voltages of the power semiconductor switches S5 and S6; besides, the two power semiconductor switches S7 and S8 connected in series can also be integrate into a single power semiconductor switch, and the withstand voltage of that single power semiconductor switch is about the same as a sum of the withstand voltages of the power semiconductor switches S7 and S8.

In FIG. 7, each of the power semiconductor switches S1-S12 includes a diode connected inside, and each of the power semiconductor switches S1-S12 and the corresponding diode connected inside are reversely connected in parallel. For example, the power semiconductor switches S1-S12 can be IGBTs, GTO thyristors, IGCTs or other switching elements, people skilled in this art can flexibly choose the elements according to the design requirements.

The bus capacitor module 740 includes a first bus capacitor unit C3 and a second bus capacitor unit C4. A terminal of the first bus capacitor unit C3 connects to the positive terminal 741, and the other terminals of the first bus capacitor unit C3 connects to the neutral point 743, a terminal of the second bus capacitor unit C4 connects to the neutral point 743, and the other terminal of the second bus capacitor unit C4 connects to the negative terminal 742.

Under operation, the first bus capacitor unit C3 and the second bus capacitor unit C4 receive the DC input power, and controls the on-off of the power semiconductor switches S1-S12 respectively by the PWM signals, to make the five-level rectifier 700 performing the inverting function, thereby outputting AC power from the AC terminal U.

Similarly, under operation, the AC terminal U receives the AC input power, and controls the on-off of the power semiconductor switches S1-S12 respectively by the PWM signals, to make the five-level rectifier 700 performing the rectifying function, thereby outputting DC power from the first bus capacitor unit C3 and the second bus capacitor unit C4.

In other exemplary embodiments, the PFM signals or the PAM signals can be chosen for respectively controlling on-off of the power semiconductor switches S1-S12, thereby allowing the operation of the five-level converter 700.

For further describing the operations of the five-level converter 700, please refer to table 7, under the operation a voltage on each of the power semiconductor switches is V/2, and the on-off states corresponding to each voltage on the AC terminal U are illustrated as table 7. In addition, the voltage waveforms of the AC terminal U of the five-level converter are illustrated in FIG. 13.

TABLE 7

|     | State 1 | State 2 | State 3 | State 4 | State 5 | State 6 | State 7 |
| --- | --- | --- | --- | --- | --- | --- | --- |
| S1  | ON  | ON  | OFF | OFF | OFF | OFF | OFF |
| S2  | ON  | OFF | ON  | OFF | OFF | OFF | OFF |
| S3  | ON  | OFF | ON  | OFF | OFF | OFF | OFF |
| S4  | ON  | OFF | ON  | OFF | OFF | OFF | OFF |
| S5  | OFF | OFF | OFF | OFF | OFF | ON  | ON  |
| S6  | OFF | OFF | OFF | OFF | OFF | ON  | ON  |
| S7  | OFF | OFF | OFF | OFF | ON  | OFF | ON  |
| S8  | OFF | OFF | OFF | OFF | ON  | OFF | ON  |
| S9  | ON  | ON  | ON  | ON  | ON  | OFF | OFF |
| S10 | OFF | ON  | OFF | ON  | ON  | ON  | ON  |
| S11 | ON  | ON  | ON  | ON  | OFF | ON  | OFF |
| S12 | OFF | OFF | ON  | ON  | ON  | ON  | ON  |
| U   | V   | V/2 | V/2 | 0   | −V/2 | −V/2 | −V  |

Table 7 illustrates an operation mode of the five-level converter 700, however, please note that the five-level converter 700 has many operation modes, table 7 is merely an exemplary embodiment. In addition, the applications of the five-level converter 700 are easily understood by people with ordinary skills in this art, and are not in the scope of the present disclosure, thereby further descriptions are omit for the sake of brevity.

Figure 8:
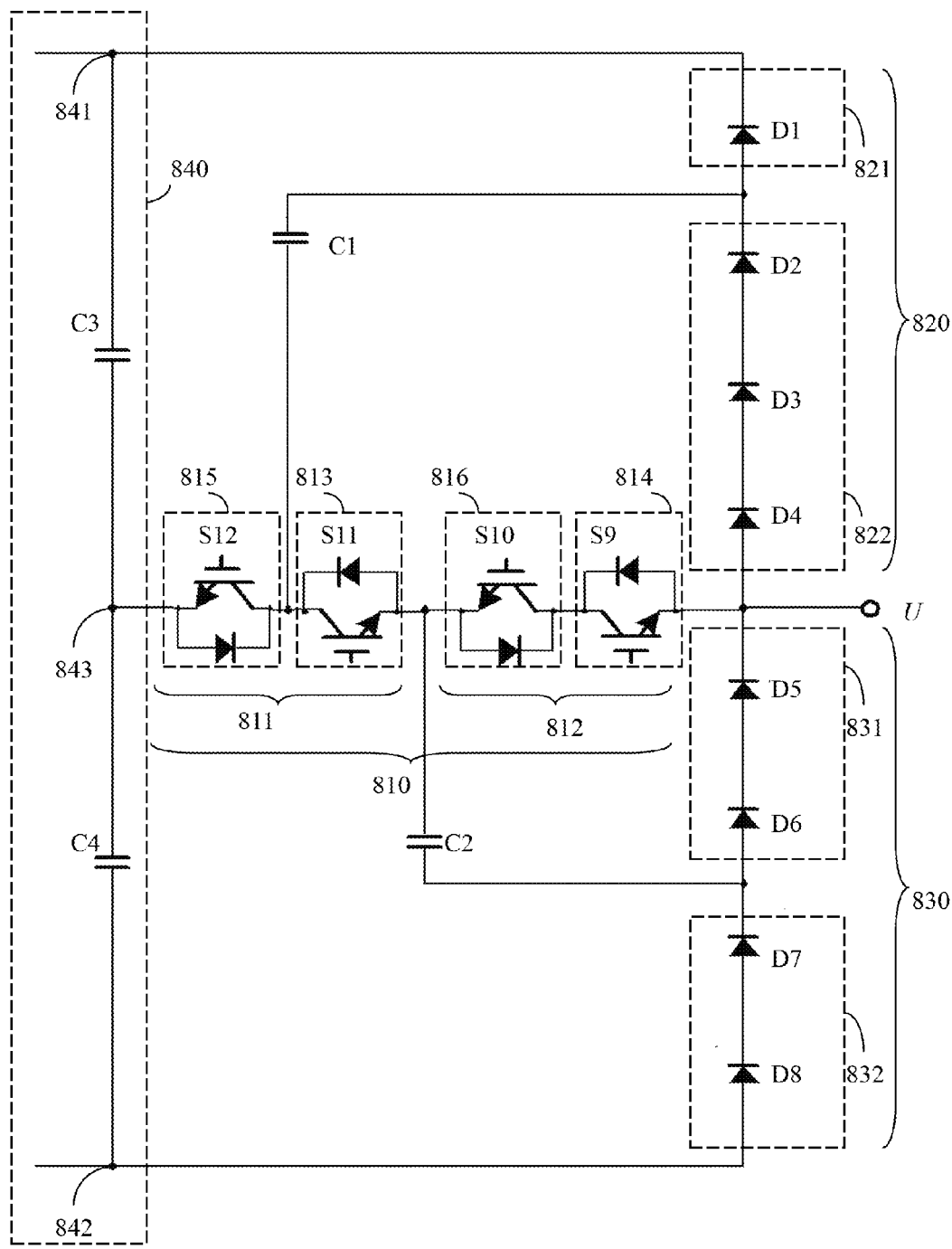
FIG. 8 is a diagram illustrating a circuit diagram of a five-level converting device according to an eighth exemplary embodiment of the present disclosure.

FIG. 8 is a diagram illustrating a circuit diagram of a five-level converting device (using single-phase as an example) according to an eighth exemplary embodiment of the present disclosure. The structure of the five-level rectifier 800 is similar to that of the five-level converter 700, the difference between the five-level rectifier 800 and the five-level converter 700 is that the power semiconductor switches S1-S8 in FIG. 7 are replaced by the diodes D1-D8 in FIG. 8. As shown in FIG. 8, the five-level rectifier 800 includes an AC terminal U, a first switch module 810, a second switch module 820, a third switch module 830, a first flying capacitor unit C1, a second flying capacitor unit C2 and a bus capacitor module 840.

In FIG. 8, the bus capacitor module 840 has a positive terminal 841, a negative terminal 842 and a neutral point 843. One of the two terminals of the first switch module 810 connects to the neutral point 843 of the bus capacitor module 840 and the other terminal connects to the AC terminal U, wherein the first switch module 810 includes a first bidirectional switching circuit 811 and a second bidirectional switching circuit 812 cascaded to each other, the first bidirectional switching circuit 811 include two first switching units 813 and 815 reversely connected in series, and the second bidirectional switching circuit 812 includes two first switching units 814 and 816 reversely connected in series. One of the two terminals of the second switch module 820 connects to the positive terminal 841 of the bus capacitor module 840, and other terminal connects to the AC terminal U, wherein the second switch module 620 includes a plurality of second switching units 821 and 822 connected in series. One of the two terminals of the third switch module 630 connects to the negative terminal 842 of the bus capacitor module 840, and the other terminal connects to the AC terminal U, wherein the third switch module 830 includes a plurality of third switching units 831 and 832 connected in series. The first flying capacitor unit C1 connects across the first switch module 810 and the second switch module 820, the second flying capacitor unit C2 connects across the first switch module 810 and the third switch module 830, wherein in the first switch module 810, the first switching units 813 and 816 connect to the second flying capacitor unit C2, and the first switching units 813 and 815 connect to the first flying capacitor unit C1.

The first bidirectional switching circuit 811 connects to the neutral point 843, the second bidirectional switching circuit 812 connects to the AC terminal U, a terminal of the second flying capacitor unit C2 connects to a connection point between the first bidirectional switching circuit 811 and the second bidirectional switching circuit 812, a terminal of the first flying capacitor unit C1 connects to a connection point between two first switching units 813 and 815 in the first bidirectional switching circuit 811; between the two connection points is an interval of the first switching unit 813, thereby the two aforementioned connection points do not directly connect to each other. Another terminal of the first flying capacitor unit C1 connects to a connection point between the two second switching units 821 and 822, and another terminal of the second flying capacitor unit C2 connects to a connection point between the two third switching units 831 and 832.

In FIG. 8, each of the first switching units 814, 816, 813 and 815 includes a corresponding power semiconductor switches S9, S10, S11, or S12. The second switching unit 821 includes at least one power semiconductor switch for connecting to the positive terminal 841, in this exemplary embodiment, a single power semiconductor switch D1 is used as an example, and the second switching unit 822 includes at least one power semiconductor switch, herein three power semiconductor switches D2, D3 and D4 are used as an example, in which voltage withstand characters of the power semiconductor switches D1, D2, D3 and D4 are about the same; the third switching unit 831 includes at least one power semiconductor switch, in this exemplary embodiment two power semiconductor switches D5 and D6 connected in series are used as an example, and the third switching unit 832 includes at least one power semiconductor switch, herein the two power semiconductor switches D7 and D8 connected in series are used as an example, in which voltage withstand characters of the power semiconductor switches D5, D6, D7, and D8 are about the same.

Please note that the amounts of the power semiconductor switches in each of the second switching units 821, 822 and of the third switching units 831, 832 in FIG. 8 are for the illustrative purposes only, and do not meant to be a limitation of the present disclosure, people skilled in this field can choose the amount of the power semiconductor switches and the corresponding withstanding voltages according to the design requirements. For example, the three power semiconductor switches D2, D3 and D4 connected in series can be integrate into a single power semiconductor switch, and the withstand voltage of that single power semiconductor switch is about the same as a sum of the withstand voltages of the power semiconductor switches D2, D3, and D4; the two power semiconductor switches D5 and D6 connected in series can also be integrate into a single power semiconductor switch, and the withstand voltage of that single power semiconductor switch is about the same as a sum of the withstand voltages of the power semiconductor switches D5 and D6; besides, the two power semiconductor switches D7 and D8 connected in series can also be integrate into a single power semiconductor switch, and the withstand voltage of that single power semiconductor switch is about the same as a sum of the withstand voltages of the power semiconductor switches D7 and D8.

In FIG. 8, each of the power semiconductor switches D1-D8 are diodes D1-D8, each of the power semiconductor switches S9-S12 includes a diode connected inside, and each of the power semiconductor switches S9-S12 and the corresponding diode connected inside are reversely connected in parallel. For example, the power semiconductor switches S9-S12 can be IGBTs, GTO thyristors, IGCTs or other switching elements, people skilled in this art can flexibly choose the elements according to the design requirements.

In FIG. 8, the bus capacitor module 840 includes a first bus capacitor unit C3 and a second bus capacitor unit C4. A terminal of the first bus capacitor unit C3 connects to the positive terminal 841, and the other terminals of the first bus capacitor unit C3 connects to the neutral point 843; a terminal of the second bus capacitor unit C4 connects to the neutral point 843, and the other terminal of the second bus capacitor unit C4 connects to the negative terminal 842.

Under operation, the AC terminal U receives the AC input power, and controls the on-off of the power semiconductor switches S9-S12 respectively by the PWM signals, to make the five-level rectifier 800 performing the rectifying function, thereby outputting DC power from the first bus capacitor unit C3 and the second bus capacitor unit C4. In other exemplary embodiments, the PFM signals or the PAM signals can be chosen for respectively controlling on-off of the power semiconductor switches S9-S12, thereby allowing the operation of the five-level converter 800.

For further describing the operations of the five-level converter 800, please refer to table 8, under the operation a voltage on each of the power semiconductor switches is V/2, and the on-off states corresponding to each voltage on the AC terminal U are illustrated as table 8. In addition, the voltage waveforms of the AC terminal U of the five-level converter are illustrated in FIG. 13.

TABLE 8

|  | State 1 | State 2 | State 3 | State 4 | State 5 | State 6 | State 7 |
| --- | --- | --- | --- | --- | --- | --- | --- |
| D1 | ON | OFF | ON | OFF | OFF | OFF | OFF |
| D2 | ON | ON | OFF | OFF | OFF | OFF | OFF |
| D3 | ON | ON | OFF | OFF | OFF | OFF | OFF |
| D4 | ON | ON | OFF | OFF | OFF | OFF | OFF |
| D5 | OFF | OFF | OFF | OFF | ON | OFF | ON |
| D6 | OFF | OFF | OFF | OFF | ON | OFF | ON |
| D7 | OFF | OFF | OFF | OFF | OFF | ON | ON |
| D8 | OFF | OFF | OFF | OFF | OFF | ON | ON |
| S9 | ON | ON | ON | ON | OFF | ON | OFF |
| S10 | OFF | OFF | ON | ON | ON | ON | ON |
| S11 | ON | ON | ON | ON | ON | OFF | OFF |
| S12 | OFF | ON | OFF | ON | ON | ON | ON |
| U | V | V/2 | V/2 | 0 | −V/2 | −V/2 | −V |

Table 8 illustrates an operation mode of the five-level converter 800, however, please note that the five-level converter 800 has many operation modes, table 8 is merely an exemplary embodiment. In addition, the applications of the five-level converter 800 are easily understood by people with ordinary skills in this art, and are not in the scope of the present disclosure, thereby further descriptions are omit for the sake of brevity.

Figure 9:
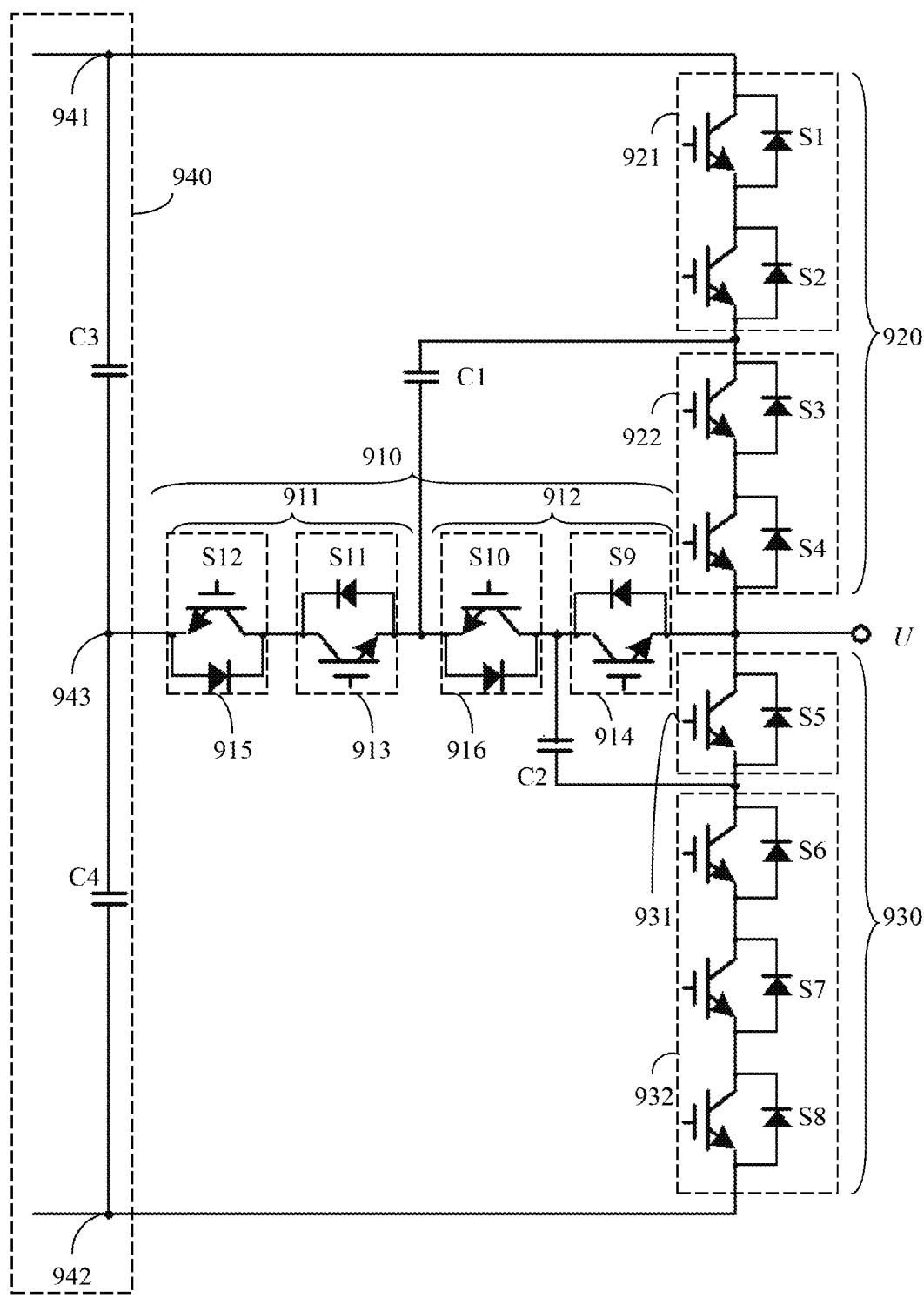
FIG. 9 is a diagram illustrating a circuit diagram of a five-level converting device according to a ninth exemplary embodiment of the present disclosure.

FIG. 9 is a diagram illustrating a circuit diagram of a five-level converting device (using single-phase as an example) according to a ninth exemplary embodiment of the present disclosure. The structure of the five-level rectifier 900 is similar to that of the five-level converter 700, the difference between the five-level rectifier 900 and the five-level converter 700 are the connections of the first flying capacitor unit C1 and of the second flying capacitor unit C2. As shown in FIG. 9, the five-level converter 900 includes an AC terminal U, a first switch module 910, a second switch module 920, a third switch module 930, a first flying capacitor unit C1, a second flying capacitor unit C2 and a bus capacitor module 940.

In FIG. 9, the bus capacitor module 940 has a positive terminal 941, a negative terminal 942 and a neutral point 943. One of the two terminals of the first switch module 910 connects to the neutral point 943 of the bus capacitor module 940 and the other terminal connects to the AC terminal U, wherein the first switch module 910 includes a first bidirectional switching circuit 911 and a second bidirectional switching circuit 912 cascaded to each other, the first bidirectional switching circuit 911 includes two first switching units 913 and 915 reversely connected in series, and the second bidirectional switching circuit 912 includes two first switching units 914 and 916 reversely connected in series. One of the two terminals of the second switch module 920 connects to the positive terminal 941 of the bus capacitor module 940, and other terminal connects to the AC terminal U, wherein the second switch module 920 includes a plurality of second switching units 921 and 922 connected in series. One of the two terminals of the third switch module 930 connects to the negative terminal 942 of the bus capacitor module 940, and the other terminal connects to the AC terminal U, wherein the third switch module 930 includes a plurality of third switching units 931 and 932 connected in series. The first flying capacitor unit C1 connects across the first switch module 910 and the second switch module 920, the second flying capacitor unit C2 connects across the first switch module 910 and the third switch module 930, wherein in the first switch module 910, the first switching units 913 and 916 connect to the first flying capacitor unit C1, and the first switching units 914 and 916 connect to the second flying capacitor unit C2.

The first bidirectional switching circuit 911 connects to the neutral point 943, the second bidirectional switching circuit 912 connects to the AC terminal U, a terminal of the first flying capacitor unit C1 connects to a connection point between the first bidirectional switching circuit 911 and the second bidirectional switching circuit 912, a terminal of the second flying capacitor unit C2 connects to a connection point between two first switching units 914 and 916 in the second bidirectional switching circuit 912; between the two connection points is an interval of the first switching unit 916, thereby the two aforementioned connection points do not directly connect to each other. Another terminal of the first flying capacitor unit C1 connects to a connection point between the two second switching units 921 and 922, and another terminal of the second flying capacitor unit C2 connects to a connection point between the two third switching units 931 and 932.

In FIG. 9, each of the first switching units 914, 916, 913 and 915 includes a corresponding power semiconductor switches S9, S10, S11, or S12. The second switching unit 921 includes at least one power semiconductor switch for connecting to the positive terminal 941, in this exemplary embodiment, two power semiconductor switches S1 and S2 connected in series are used as an example, and the second switching unit 922 includes at least one power semiconductor switch for connecting to the AC terminal U, herein two power semiconductor switches S3 and S4 are used as an example, in which voltage withstand characters of the power semiconductor switches S1, S2, S3 and S4 are about the same; the third switching unit 931 includes at least one power semiconductor switch for connecting to the AC terminal U, in this exemplary embodiment a single power semiconductor switch S5 is used as an example, and the third switching unit 932 includes at least one power semiconductor switch for connecting to the negative terminal 942, herein the three power semiconductor switches S6, S7 and S8 connected in series are used as an example, in which voltage withstand characters of the power semiconductor switches S5, S6, S7, and S8 are about the same.

Please note that the amounts of the power semiconductor switches in each of the second switching units 921, 922 and of the third switching units 931, 932 in FIG. 9 are for the illustrative purposes only, and do not meant to be a limitation of the present disclosure, people skilled in this field can choose the amount of the power semiconductor switches and the corresponding withstanding voltages according to the design requirements. For example, the two power semiconductor switches S1 and S2 connected in series can be integrate into a single power semiconductor switch, and the withstand voltage of that single power semiconductor switch is about the same as a sum of the withstand voltages of the power semiconductor switches S1 and S2; the two power semiconductor switches S3 and S4 connected in series can also be integrate into a single power semiconductor switch, and the withstand voltage of that single power semiconductor switch is about the same as a sum of the withstand voltages of the power semiconductor switches S3 and S4; besides, the three power semiconductor switches S6, S7 and S8 connected in series can also be integrate into a single power semiconductor switch, and the withstand voltage of that single power semiconductor switch is about the same as a sum of the withstand voltages of the power semiconductor switches S6, S7 and S8.

In FIG. 9, each of the power semiconductor switches S1-S12 includes a diode connected inside, and each of the power semiconductor switches S1-S12 and the corresponding diode connected inside are reversely connected in parallel. For example, the power semiconductor switches S1-S12 can be IGBTs, GTO thyristors, IGCTs or other switching elements, people skilled in this art can flexibly choose the elements according to the design requirements.

The bus capacitor module 940 includes a first bus capacitor unit C3 and a second bus capacitor unit C4. A terminal of the first bus capacitor unit C3 connects to the positive terminal 941, and the other terminal of the first bus capacitor unit C3 connects to the neutral point 943; a terminal of the second bus capacitor unit C4 connects to the neutral point 943, and the other terminal of the second bus capacitor unit C4 connects to the negative terminal 942.

Under operation, the first bus capacitor unit C3 and the second bus capacitor unit C4 can receive the DC input power, and controls the on-off of the power semiconductor switches S1-S12 respectively by the PWM signals, to make the five-level rectifier 900 performing the inverting function, thereby outputting AC power from the AC terminal U.

Similarly, under operation, the AC terminal U receives the AC input power, and controls the on-off of the power semiconductor switches S1-S12 respectively by the PWM signals, to make the five-level rectifier 900 performing the rectifying function, thereby outputting DC power from the first bus capacitor unit C3 and the second bus capacitor unit C4.

In other exemplary embodiments, the PFM signals or the PAM signals can be chosen for respectively controlling on-off of the power semiconductor switches S1-S12, thereby allowing the operation of the five-level converter 900.

For further describing the operations of the five-level converter 900, please refer to table 9, under the operation a voltage on each of the power semiconductor switches is V/2, and the on-off states corresponding to each voltage on the AC terminal U are illustrated as table 9. In addition, the voltage waveforms of the AC terminal U of the five-level converter are illustrated in FIG. 13.

TABLE 9

|     | State 1 | State 2 | State 3 | State 4 | State 5 | State 6 | State 7 |
| --- | --- | --- | --- | --- | --- | --- | --- |
| S1  | ON  | ON  | OFF | OFF | OFF | OFF | OFF |
| S2  | ON  | ON  | OFF | OFF | OFF | OFF | OFF |
| S3  | ON  | OFF | ON  | OFF | OFF | OFF | OFF |
| S4  | ON  | OFF | ON  | OFF | OFF | OFF | OFF |
| S5  | OFF | OFF | OFF | OFF | OFF | ON  | ON  |
| S6  | OFF | OFF | OFF | OFF | ON  | OFF | ON  |
| S7  | OFF | OFF | OFF | OFF | ON  | OFF | ON  |
| S8  | OFF | OFF | OFF | OFF | ON  | OFF | ON  |
| S9  | ON  | ON  | ON  | ON  | ON  | OFF | OFF |
| S10 | OFF | ON  | OFF | ON  | ON  | ON  | ON  |
| S11 | ON  | ON  | ON  | ON  | OFF | ON  | OFF |
| S12 | OFF | OFF | ON  | ON  | ON  | ON  | ON  |
| U   | V   | V/2 | V/2 | 0   | −V/2 | −V/2 | −V  |

Table 9 illustrates an operation mode of the five-level converter 900, however, please note that the five-level converter 900 has many operation modes, table 9 is merely an exemplary embodiment. In addition, the applications of the five-level converter 900 are easily understood by people with ordinary skills in this art, and are not in the scope of the present disclosure, thereby further descriptions are omit for the sake of brevity.

Figure 10:
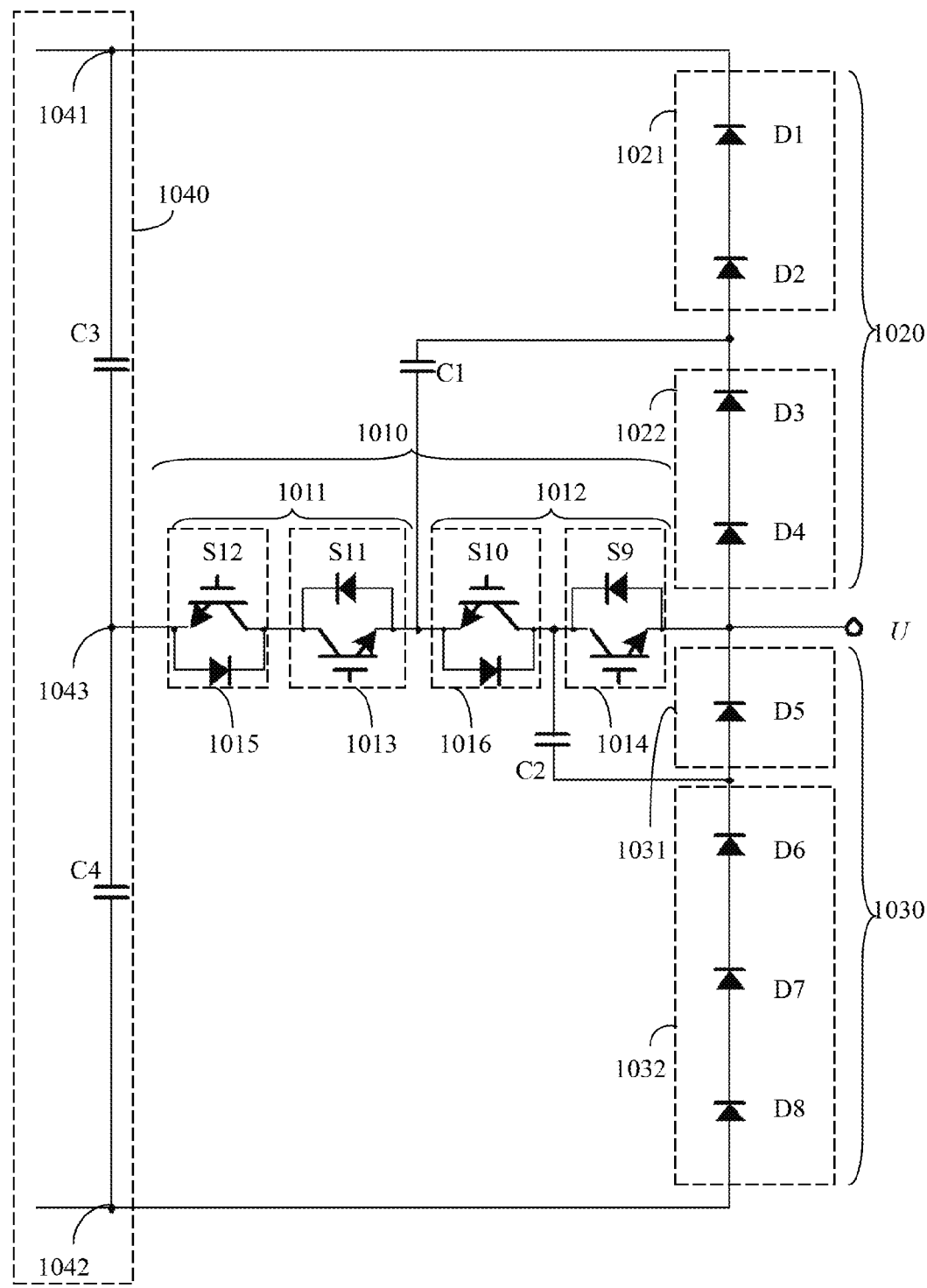
FIG. 10 is a diagram illustrating a circuit diagram of a five-level converting device according to a tenth exemplary embodiment of the present disclosure.

FIG. 10 is a diagram illustrating a circuit diagram of a five-level converting device (using single-phase as an example) according to a tenth exemplary embodiment of the present disclosure. The structure of the five-level rectifier 1000 is similar to that of the five-level converter 900, the difference between the five-level rectifier 1000 and the five-level converter 900 is that the power semiconductor switches S1-S8 in FIG. 9 are replaced by the diodes D1-D8 in FIG. 10. As shown in FIG. 10, the five-level rectifier 1000 includes an AC terminal U, a first switch module 1010, a second switch module 1020, a third switch module 1030, a first flying capacitor unit C1, a second flying capacitor unit C2 and a bus capacitor module 1040.

In FIG. 10, the bus capacitor module 1040 has a positive terminal 1041, a negative terminal 1042 and a neutral point 1043. One of the two terminals of the first switch module 1010 connects to the neutral point 1043 of the bus capacitor module 1040, and the other terminal connects to the AC terminal U, wherein the first switch module 1010 includes a first bidirectional switching circuit 1011 and a second bidirectional switching circuit 1012 cascaded to each other, the first bidirectional switching circuit 1011 includes two first switching units 1013 and 1015 reversely connected in series, the second bidirectional switching circuit 1012 includes two first switching units 1014 and 1016 reversely connected in series. One of the two terminals of the second switch module 1020 connects to the positive terminal 1041 of the bus capacitor module 1040, and other terminal connects to the AC terminal U, wherein the second switch module 1020 includes a plurality of second switching units 1021 and 1022 connected in series. One of the two terminals of the third switch module 1030 connects to the negative terminal 1042 of the bus capacitor module 1040 and the other terminal connects to the AC terminal U, wherein the third switch module 1030 includes a plurality of third switching units 1031 and 1032 connected in series. The first flying capacitor unit C1 connects across the first switch module 1010 and the second switch module 1020, and the second flying capacitor unit C2 connects across the first switch module 1010 and the third switch module 1030, wherein in the first switch module 1010, the first switching units 1013 and 1016 connect to the first flying capacitor unit C1 and the first switching units 1014 and 1016 connects to the second flying capacitor unit C2.

The first bidirectional switching circuit 1011 connects to the neutral point 1043, the second bidirectional switching circuit 1012 connects to the AC terminal U, a terminal of the first flying capacitor unit C1 connects to a connection point between the first bidirectional switching circuit 1011 and the second bidirectional switching circuit 1012, a terminal of the second flying capacitor unit C2 connects to a connection point between two first switching units 1014 and 1016 in the second bidirectional switching circuit 1012; between the two connection points is an interval of the first switching unit 1016, thereby the two aforementioned connection points do not directly connect to each other. Another terminal of the first flying capacitor unit C1 connects to a connection point between the two second switching units 1021 and 1022, and another terminal of the second flying capacitor unit C2 connects to a connection point between the two third switching units 1031 and 1032.

In FIG. 10, each of the first switching units 1014, 1016, 1013 and 1015 includes a corresponding power semiconductor switches S9, S10, S11, or S12. The second switching unit 1021 includes at least one power semiconductor switch for connecting to the positive terminal 1041, in this exemplary embodiment, two power semiconductor switches D1 and D2 connected in series are used as an example, and the second switching unit 1022 includes at least one power semiconductor switch for connecting to the AC terminal U, herein two power semiconductor switches D3 and D4 are used as an example, in which voltage withstand characters of the power semiconductor switches D1, D2, D3 and D4 are about the same; the third switching unit 1031 includes at least one power semiconductor switch for connecting to the AC terminal U, in this exemplary embodiment a single power semiconductor switch D5 is used as an example, and the third switching unit 1032 includes at least one power semiconductor switch for connecting to the negative terminal 1042, herein three power semiconductor switches D6, D7 and D8 connected in series are used as an example, in which voltage withstand characters of the power semiconductor switches D5, D6, D7, and D8 are about the same.

Please note that the amounts of the power semiconductor switches in each of the second switching units 1021, 1022 and of the third switching units 1031, 1032 in FIG. 10 are for the illustrative purposes only, and do not meant to be a limitation of the present disclosure, people skilled in this field can choose the amount of the power semiconductor switches and the corresponding withstanding voltages according to the design requirements. For example, the two power semiconductor switches D1 and D2 connected in series can be integrate into a single power semiconductor switch, and the withstand voltage of that single power semiconductor switch is about the same as a sum of the withstand voltages of the power semiconductor switches D1 and D2; the two power semiconductor switches D3 and D4 connected in series can also be integrate into a single power semiconductor switch, and the withstand voltage of that single power semiconductor switch is about the same as a sum of the withstand voltages of the power semiconductor switches D3 and D4; besides, the three power semiconductor switches D6, D7 and D8 connected in series can also be integrate into a single power semiconductor switch, and the withstand of that single power semiconductor switch voltage is about the same as a sum of the withstand voltages of the power semiconductor switches D6, D7 and D8.

In FIG. 10, the power semiconductor switches D1-D8 are diodes, and each of the power semiconductor switches S9-S12 includes a diode connected inside, and each of the power semiconductor switches S9-S12 and the corresponding diode connected inside are reversely connected in parallel. For example, the power semiconductor switches S9-S12 can be IGBTs, GTO thyristors, IGCTs or other switching elements, people skilled in this art can flexibly choose the elements according to the design requirements.

The bus capacitor module 1040 includes a first bus capacitor unit C3 and a second bus capacitor unit C4. A terminal of the first bus capacitor unit C3 connects to the positive terminal 1041, and the other terminal of the first bus capacitor unit C3 connects to the neutral point 1043; a terminal of the second bus capacitor unit C4 connects to the neutral point 1043, and the other terminal of the second bus capacitor unit C4 connects to the negative terminal 1042.

Under operation, the AC terminal U receives the AC input power, and controls the on-off of the power semiconductor switches S9-S12 respectively by the PWM signals, to make the five-level rectifier 1000 performing the rectifying function, thereby outputting DC power from the first bus capacitor unit C3 and the second bus capacitor unit C4. In other exemplary embodiments, the PFM signals or the PAM signals can be chosen for respectively controlling on-off of the power semiconductor switches S9-S12, thereby allowing the operation of the five-level converter 1000.

For further describing the operations of the five-level converter 1000, please refer to table 10, under the operation a voltage on each of the power semiconductor switches is V/2, and the on-off states corresponding to each voltage on the AC terminal U are illustrated as table 10. In addition, the voltage waveforms of the AC terminal U of the five-level converter are illustrated in FIG. 13.

TABLE 10

|     | State 1 | State 2 | State 3 | State 4 | State 5 | State 6 | State 7 |
| --- | --- | --- | --- | --- | --- | --- | --- |
| D1  | ON  | OFF | ON  | OFF | OFF | OFF | OFF |
| D2  | ON  | OFF | ON  | OFF | OFF | OFF | OFF |
| D3  | ON  | ON  | OFF | OFF | OFF | OFF | OFF |
| D4  | ON  | ON  | OFF | OFF | OFF | OFF | OFF |
| D5  | OFF | OFF | OFF | OFF | ON  | OFF | ON  |
| D6  | OFF | OFF | OFF | OFF | OFF | ON  | ON  |
| D7  | OFF | OFF | OFF | OFF | OFF | ON  | ON  |
| D8  | OFF | OFF | OFF | OFF | OFF | ON  | ON  |
| S9  | ON  | ON  | ON  | ON  | OFF | ON  | OFF |
| S10 | OFF | OFF | ON  | ON  | ON  | ON  | ON  |
| S11 | ON  | ON  | ON  | ON  | ON  | OFF | OFF |
| S12 | OFF | ON  | OFF | ON  | ON  | ON  | ON  |
| U   | V   | V/2 | V/2 | 0   | −V/2 | −V/2 | −V  |

Table 10 illustrates an operation mode of the five-level converter 1000, however, please note that the five-level converter 1000 has many operation modes, table 10 is merely an exemplary embodiment. In addition, the applications of the five-level converter 1000 are easily understood by people with ordinary skills in this art, and are not in the scope of the present disclosure, thereby further descriptions are omit for the sake of brevity.

Figure 11:
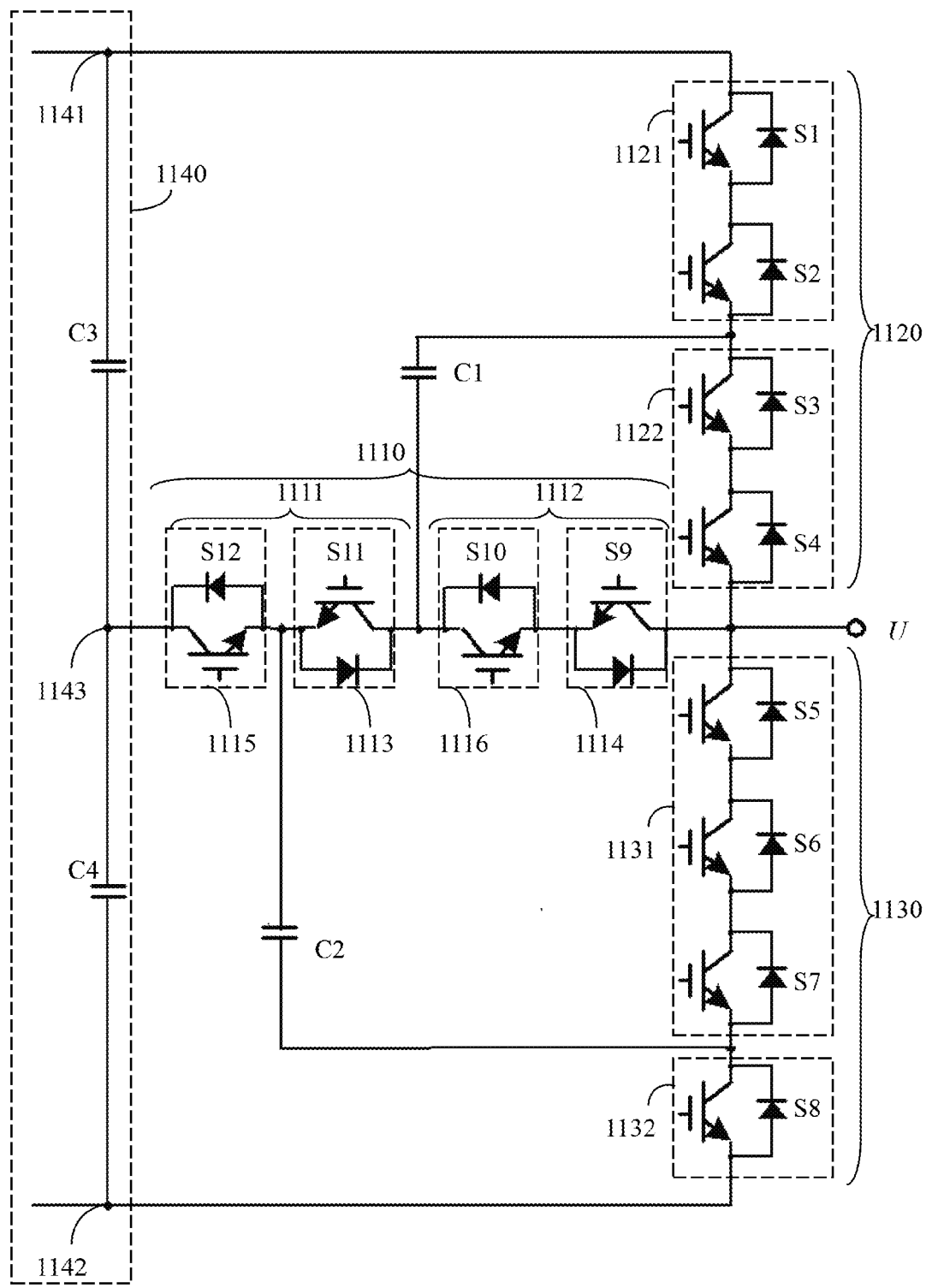
FIG. 11 is a diagram illustrating a circuit diagram of a five-level converting device according to an eleventh exemplary embodiment of the present disclosure.

FIG. 11 is a diagram illustrating a circuit diagram of a five-level converting device (using single-phase as an example) according to an eleventh exemplary embodiment of the present disclosure. The structure of the five-level rectifier 1100 is similar to that of the five-level converter 300, the differences between the five-level rectifier 1100 and the five-level converter 300 are the connections of the first flying capacitor unit C1. As shown in FIG. 11, the five-level converter 1100 includes an AC terminal U, a first switch module 1110, a second switch module 1120, a third switch module 1130, a first flying capacitor unit C1, a second flying capacitor unit C2 and a bus capacitor module 1140.

In FIG. 11, the bus capacitor module 1140 has a positive terminal 1141, a negative terminal 1142 and a neutral point 1143. One of the two terminals of the first switch module 1110 connects to the neutral point 1143 of the bus capacitor module 1140, and the other terminal connects to the AC terminal U, wherein the first switch module 1110 includes a first bidirectional switching circuit 1111 and a second bidirectional switching circuit 1112 cascaded to each other, the first bidirectional switching circuit 1111 includes two first switching units 1113, 1115 reversely connected in series, the second bidirectional switching circuit 1112 includes two first switching units 1114 and 1116 reversely connected in series. One of the two terminals of the second switch module 1120 connects to the positive terminal 1141 of the bus capacitor module 1140, and the other terminal connects to the AC terminal U, wherein the second switch module 1120 includes a plurality of second switching units 1121 and 1122 connected in series. One of the two terminals of the third switch module 1130 connects to the negative terminal 1142 of the bus capacitor module 1140, and the other terminal connects to the AC terminal U, wherein the third switch module 1130 includes a plurality of third switching units 1131 and 1132 connected in series. The first flying capacitor unit C1 connects across the first switch module 1110 and the second switch module 1120, and the second flying capacitor unit C2 connects across the first switch module 1110 and the third switch module 1130, wherein in the first switch module 1110, the first switching units 1113 and the 1116 connect to the first flying capacitor unit C1, and the first switching units 1113 and 1115 connect to the second flying capacitor unit C2.

The first bidirectional switching circuit 1111 connects to the neutral point 1143, the second bidirectional switching circuit 1112 connects to the AC terminal U, a terminal of the first flying capacitor unit C1 connects to a connection point between the first bidirectional switching circuit 1111 and the second bidirectional switching circuit 1112, a terminal of the second flying capacitor unit C2 connects to a connection point between two first switching units 1113 and 1115 in the first bidirectional switching circuit 1111; between the two connection points is an interval of the first switching unit 1113, thereby the two aforementioned connection points do not directly connect to each other. Another terminal of the first flying capacitor unit C1 connects to a connection point between the two second switching units 1121 and 1122, and another terminal of the second flying capacitor unit C2 connects to a connection point between the two third switching units 1131 and 1132.

In FIG. 11, each of the first switching units 1114, 1116, 1113 and 1115 includes a corresponding power semiconductor switches S9, S10, S11, or S12. The second switching unit 1121 includes at least one power semiconductor switch for connecting to the positive terminal 1141, in this exemplary embodiment, two power semiconductor switches S1 and S2 connected in series are used as an example, and the second switching unit 1122 includes at least one power semiconductor switch for connecting to the AC terminal U, herein two power semiconductor switches S3 and S4 are used as an example, in which voltage withstand characters of the power semiconductor switches S1, S2, S3 and S4 are about the same; the third switching unit 1131 includes at least one power semiconductor switch for connecting to the AC terminal U, in this exemplary embodiment three power semiconductor switches S5, S6, and S7 are used as an example, and the third switching unit 1132 includes at least one power semiconductor switch for connecting to the negative terminal 1142, herein a single power semiconductor switch S8 is used as an example, in which voltage withstand characters of the power semiconductor switches S5, S6, S7, and S8 are about the same.

Please note that the amounts of the power semiconductor switches in each of the second switching units 1121, 1122 and of the third switching units 1131, 1132 in FIG. 11 are for the illustrative purposes only, and do not meant to be a limitation of the present disclosure, people skilled in this field can choose the amount of the power semiconductor switches and the corresponding withstanding voltages according to the design requirements. For example, the two power semiconductor switches S1 and S2 connected in series can be integrate into a single power semiconductor switch, and the withstand voltage of that single power semiconductor switch is about the same as a sum of the withstand voltages of the power semiconductor switches S1 and S2; the two power semiconductor switches S3 and S4 connected in series can also be integrate into a single power semiconductor switch, and the withstand voltage of that single power semiconductor switch is about the same as a sum of the withstand voltages of the power semiconductor switches S3 and S4; besides, the three power semiconductor switches S5, S6 and S7 connected in series can also be integrate into a single power semiconductor switch, and the withstand voltage of that single power semiconductor switch is about the same as a sum of the withstand voltages of the power semiconductor switches S5, S6 and S7.

In FIG. 11, each of the power semiconductor switches S1-S12 includes a diode connected inside, and each of the power semiconductor switches S1-S12 and the corresponding diode connected inside are reversely connected in parallel. For example, the power semiconductor switches S1-S12 can be IGBTs, GTO thyristors, IGCTs or other switching elements, people skilled in this art can flexibly choose the elements according to the design requirements.

The bus capacitor module 1140 includes a first bus capacitor unit C3 and a second bus capacitor unit C4. A terminal of the first bus capacitor unit C3 connects to the positive terminal 1141, and the other terminal of the first bus capacitor unit C3 connects to the neutral point 1143; a terminal of the second bus capacitor unit C4 connects to the neutral point 1143, and the other terminal of the second bus capacitor unit C4 connects to the negative terminal 1142.

Under operation, the first bus capacitor unit C3 and the second bus capacitor unit C4 receive the DC input power, and control the on-off of the power semiconductor switches S1-S12 respectively by the PWM signals, to make the five-level rectifier 1100 performing the inverting function, thereby outputting AC power from the AC terminal U.

Similarly, under operation, the AC terminal U receives the AC input power, and controls the on-off of the power semiconductor switches S1-S12 respectively by the PWM signals, to make the five-level rectifier 1100 performing the rectifying function, thereby outputting DC power from the first bus capacitor unit C3 and the second bus capacitor unit C4.

In other exemplary embodiments, the PFM signals or the PAM signals can be chosen for respectively controlling on-off of the power semiconductor switches S1-S12, thereby allowing the operation of the five-level converter 1100.

For further describing the operations of the five-level converter 1100, please refer to table 11, under the operation a voltage on each of the power semiconductor switches is V/2, and the on-off states corresponding to each voltage on the AC terminal U are illustrated as table 11. In addition, the voltage waveforms of the AC terminal U of the five-level converter are illustrated in FIG. 13.

TABLE 11

|     | State 1 | State 2 | State 3 | State 4 | State 5 | State 6 | State 7 |
| --- | --- | --- | --- | --- | --- | --- | --- |
| S1  | ON  | ON  | OFF | OFF | OFF | OFF | OFF |
| S2  | ON  | ON  | OFF | OFF | OFF | OFF | OFF |
| S3  | ON  | OFF | ON  | OFF | OFF | OFF | OFF |
| S4  | ON  | OFF | ON  | OFF | OFF | OFF | OFF |
| S5  | OFF | OFF | OFF | OFF | OFF | ON  | ON  |
| S6  | OFF | OFF | OFF | OFF | OFF | ON  | ON  |
| S7  | OFF | OFF | OFF | OFF | OFF | ON  | ON  |
| S8  | OFF | OFF | OFF | OFF | ON  | OFF | ON  |
| S9  | OFF | ON  | OFF | ON  | ON  | ON  | ON  |
| S10 | ON  | ON  | ON  | ON  | ON  | OFF | OFF |
| S11 | OFF | OFF | ON  | ON  | ON  | ON  | ON  |
| S12 | ON  | ON  | ON  | ON  | OFF | ON  | OFF |
| U   | V   | V/2 | V/2 | 0   | −V/2 | −V/2 | −V  |

Table 11 illustrates an operation mode of the five-level converter 1100, however, please note that the five-level converter 1100 has many operation modes, table 11 is merely an exemplary embodiment. In addition, the applications of the five-level converter 1100 are easily understood by people with ordinary skills in this art, and are not in the scope of the present disclosure, thereby further descriptions are omit for the sake of brevity.

Figure 12:
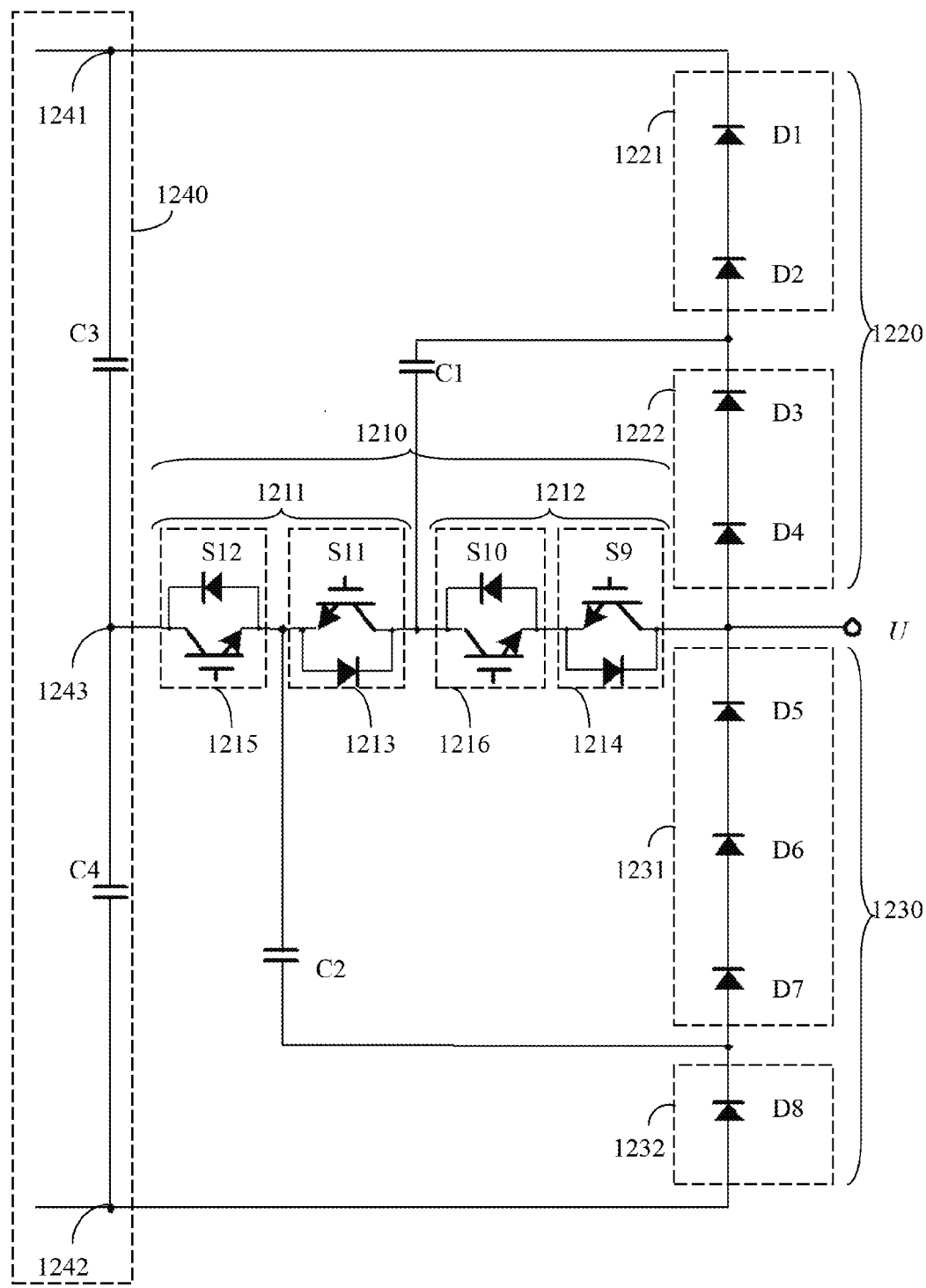
FIG. 12 is a diagram illustrating a circuit diagram of a five-level converting device according to a twelfth exemplary embodiment of the present disclosure.

FIG. 12 is a diagram illustrating a circuit diagram of a five-level converting device (using single-phase as an example) according to a twelfth exemplary embodiment of the present disclosure. The structure of the five-level rectifier 1200 is similar to that of the five-level converter 1100, the difference between the five-level rectifier 1200 and the five-level converter 1100 is that the power semiconductor switch S1-S8 in FIG. 11 are replaced by the diodes D1-D8 in FIG. 12. as shown in FIG. 12, the five-level rectifier 1200 includes an AC terminal U, a first switch module 1210, a second switch module 1220, a third switch module 1230, a first flying capacitor unit C1, a second flying capacitor unit C2 and a bus capacitor module 1240.

In FIG. 12, the bus capacitor module 1240 has a positive terminal 1241, a negative terminal 1242 and a neutral point 1243. One of the two terminals of the first switch module 1210 connects to the neutral point 1243 of the bus capacitor module 1240, and the other terminal connects to the AC terminal U, wherein the first switch module 1210 includes a first bidirectional switching circuit 1211 and a second bidirectional switching circuit 1212 cascaded to each other, the first bidirectional switching circuit 1211 includes two first switching units 1213 and 1215 reversely connected in series, the second bidirectional switching circuit 1212 includes two first switching units 1214 and 1216 reversely connected in series. One of the two terminals of the second switch module 1220 connects to the positive terminal 1241 of the bus capacitor module 1240, and the other terminal connects to the connects to the AC terminal U, wherein the second switch module 1220 includes a plurality of second switching units 1221 and 1222 connected in series. One of the two terminals of the third switch module 1230 connects to the negative terminal 1242 of the bus capacitor module 1240, and the other terminal connects to the AC terminal U, wherein the third switch module 1230 includes a plurality of third switching units 1231 and 1232 connected in series. The first flying capacitor unit C1 connects across the first switch module 1210 and the second switch module 1220, and the second flying capacitor unit C2 connects across the first switch module 1210 and the third switch module 1230, wherein in the first switch module 1210, the first switching units 1213 and 1216 connect to the first flying capacitor unit C1, and the first switching units 1213 and 1215 connect to the second flying capacitor unit C2.

The first bidirectional switching circuit 1211 connects to the neutral point 1243, the second bidirectional switching circuit 1212 connects to the AC terminal U, a terminal of the first flying capacitor unit C1 connects to a connection point between the first bidirectional switching circuit 1211 and the second bidirectional switching circuit 1212, a terminal of the second flying capacitor unit C2 connects to a connection point between two first switching units 1213 and 1215 in the first bidirectional switching circuit 1211; between the two connection points is an interval of the first switching unit 1213, thereby the two aforementioned connection points do not directly connect to each other. Another terminal of the first flying capacitor unit C1 connects to a connection point between the two second switching units 1221 and 1222, and another terminal of the second flying capacitor unit C2 connects to a connection point between the two third switching units 1231 and 1232.

In FIG. 12, each of the first switching units 1214, 1216, 1213 and 1215 includes a corresponding power semiconductor switches S9, S10, S11, or S12. The second switching unit 1221 includes at least one power semiconductor switch for connecting to the positive terminal 1241, in this exemplary embodiment, two power semiconductor switches D1 and D2 connected in series are used as an example, and the second switching unit 1222 includes at least one power semiconductor switch for connecting to the AC terminal U, herein two power semiconductor switches D3 and D4 are used as an example, in which voltage withstand characters of the power semiconductor switches D1, D2, D3 and D4 are about the same; the third switching unit 1231 includes at least one power semiconductor switch for connecting to the AC terminal U, in this exemplary embodiment three power semiconductor switches D5, D6, and D7 are used as an example, and the third switching unit 1232 includes at least one power semiconductor switch for connecting to the negative terminal 1242, herein a single power semiconductor switch D8 is used as an example, in which voltage withstand characters of the power semiconductor switches D5, D6, D7, and D8 are about the same.

Please note that the amounts of the power semiconductor switches in each of the second switching units 1221, 1222 and of the third switching units 1231, 1232 in FIG. 12 are for the illustrative purposes only, and do not meant to be a limitation of the present disclosure, people skilled in this field can choose the amount of the power semiconductor switches and the corresponding withstanding voltages according to the design requirements. For example, the two power semiconductor switches D1 and D2 connected in series can be integrate into a single power semiconductor switch, and the withstand voltage of that single power semiconductor switch is about the same as a sum of the withstand voltages of the power semiconductor switches D1 and D2; the two power semiconductor switches D3 and D4 connected in series can also be integrate into a single power semiconductor switch, and the withstand voltage of that single power semiconductor switch is about the same as a sum of the withstand voltages of the power semiconductor switches D3 and D4; besides, the three power semiconductor switches D5, D6 and D7 connected in series can also be integrate into a single power semiconductor switch, and the withstand voltage of that single power semiconductor switch is about the same as a sum of the withstand voltages of the power semiconductor switches D5, D6 and D7.

In FIG. 12, the power semiconductor switches D1-D8 are diodes, and each of the power semiconductor switches S9-S12 includes a diode connected inside, and each of the power semiconductor switches S9-S12 and the corresponding diode connected inside are reversely connected in parallel. For example, the power semiconductor switches S9-S12 can be IGBTs, GTO thyristors, IGCTs or other switching elements, people skilled in this art can flexibly choose the elements according to the design requirements.

The bus capacitor module 1240 includes a first bus capacitor unit C3 and a second bus capacitor unit C4. A terminal of the first bus capacitor unit C3 connects to the positive terminal 1241, and the other terminal of the first bus capacitor unit C3 connects to the neutral point 1243; a terminal of the second bus capacitor unit C4 connects to the neutral point 1243, and the other terminal of the second bus capacitor unit C4 connects to the negative terminal 1242.

Under operation, the AC terminal U receives the AC input power, and controls the on-off of the power semiconductor switches S9-S12 respectively by the PWM signals, to make the five-level rectifier 1200 performing the rectifying function, thereby outputting DC power from the first bus capacitor unit C3 and the second bus capacitor unit C4. In other exemplary embodiments, the PFM signals or the PAM signals can be chosen for respectively controlling on-off of the power semiconductor switches S9-S12, thereby allowing the operation of the five-level converter 1200.

For further describing the operations of the five-level converter 1200, please refer to table 12, under the operation a voltage on each of the power semiconductor switches is V/2, and the on-off states corresponding to each voltage on the AC terminal U are illustrated as table 12. In addition, the voltage waveforms of the AC terminal U of the five-level converter are illustrated in FIG. 13.

TABLE 12

|     | State 1 | State 2 | State 3 | State 4 | State 5 | State 6 | State 7 |
| --- | --- | --- | --- | --- | --- | --- | --- |
| D1 | ON | OFF | ON | OFF | OFF | OFF | OFF |
| D2 | ON | OFF | ON | OFF | OFF | OFF | OFF |
| D3 | ON | ON | OFF | OFF | OFF | OFF | OFF |
| D4 | ON | ON | OFF | OFF | OFF | OFF | OFF |
| D5 | OFF | OFF | OFF | OFF | ON | OFF | ON |
| D6 | OFF | OFF | OFF | OFF | ON | OFF | ON |
| D7 | OFF | OFF | OFF | OFF | ON | OFF | ON |
| D8 | OFF | OFF | OFF | OFF | OFF | ON | ON |
| S9 | OFF | OFF | ON | ON | ON | ON | ON |
| S10 | ON | ON | ON | ON | OFF | ON | OFF |
| S11 | OFF | ON | OFF | ON | ON | ON | ON |
| S12 | ON | ON | ON | ON | ON | OFF | OFF |
| U | V | V/2 | V/2 | 0 | −V/2 | −V/2 | −V |

Table 12 illustrates an operation mode of the five-level converter 1200, however, please note that the five-level converter 1200 has many operation modes, table 12 is merely an exemplary embodiment. In addition, the applications of the five-level converter 1200 are easily understood by people with ordinary skills in this art, and are not in the scope of the present disclosure, thereby further descriptions are omit for the sake of brevity.

In summary, the present disclosure provides a five-level convertor topology with a simple structure, which uses asymmetrical circuit structure flying capacitor unit (two flying capacitor units has different connections), thereby the circuit design is more flexible and resilient. Compared to the conversion three-level technology, the five-level conversion technology here has better electrical performance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A five-level converting device, comprising:
   an alternating current (AC) terminal;
   a bus capacitor module, having a positive terminal, a negative terminal and a neutral point;
   a first switch module, having two terminals connected to the neutral point of the bus capacitor module and the AC terminal respectively, wherein the first switch module comprises a plurality of bidirectional switching circuits cascaded to each other, each of the bidirectional switching circuits comprises two first switching units reversely connected in series;
   a second switch module, having two terminals connected to the positive terminal of the bus capacitor module and the AC terminal respectively, wherein the second switch module comprises a plurality of second switching units connected in series;
   a third switch module, having two terminals connected to the negative terminal of the bus capacitor module and the AC terminal respectively, wherein the third switch module comprises a plurality of third switching units connected in series;

a first flying capacitor unit, connected across the first switch module and the second switch module; and a second flying capacitor unit, connected across the first switch module and the third switch module, wherein the first flying capacitor unit and the second flying capacitor unit are connected to different connection points between the first switching units of the first switch module, wherein the first flying capacitor unit has a first end connected to the second switch module and a second end connected to a first connection point of the first switch module without connecting any other flying capacitor unit, and the second flying capacitor unit has a first end connected to the third switch module and a second end connected to a second connection point of the first switch module without connecting any other flying capacitor unit, wherein one or more of the first switching units are inserted between the first and second connection points of the first switch module, so that the first connection point is isolated from the second connection point when the one or more of the first switching units are turned off.

2. The five-level converting device of claim 1, wherein the bidirectional switching circuits are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the two first switching units in the first bidirectional switching circuit, and a terminal of the second flying capacitor unit connects to a connection point between the two first switching units in the second bidirectional switching circuit.

3. The five-level converting device of claim 2, wherein an amount of the second switching units is two, another terminal of the first flying capacitor unit connects to a connection point between the two second switching units, one of the two second switching units connects to the positive terminal, and the other of the second switching units connects to the AC terminal.

4. The five-level converting device of claim 2, wherein an amount of the third switching units is two, another terminal of the second flying capacitor unit connects to a connection point between the two third switching units, one of the two third switching units connects to the AC terminal, and the other of the third switching units connects to the negative terminal.

5. The five-level converting device of claim 1, wherein the bidirectional switching circuits are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the two first switching units in the second bidirectional switching circuit, and a terminal of the second flying capacitor unit connects to a connection point between the two first switching units in the first bidirectional switching circuit.

6. The five-level converting device of claim 5, wherein an amount of the second switching unit is two, another terminal of the first flying capacitor unit connects to a connection point between the two second switching units, wherein one of the two second switching units connects to the positive terminal, and the other of the second switching units connects to the AC terminal.

7. The five-level converting device of claim 5, wherein an amount of the third switching units is two, another terminal of the second flying capacitor unit connects to a connection point between the two third switching units, wherein one of the two third switching units connects to the AC terminal, and the other of the third switching units connects to the negative terminal.

8. The five-level converting device of claim 1, wherein the bidirectional switching circuits are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the two first switching units in the second bidirectional switching circuit, and a terminal of the second flying capacitor unit connects to a connection point between the first bidirectional switching circuit and the second bidirectional switching circuit.

9. The five-level converting device of claim 8, wherein an amount of the second switching unit is two, another terminal of the first flying capacitor unit connects to a connection point between the two second switching units, one of the two second switching units connects to the positive terminal, and the other of the second switching units connects to the AC terminal.

10. The five-level converting device of claim 8, wherein an amount of the third switching units is two, another terminal of the second flying capacitor unit connects to a connection point between the two third switching units, one of the two third switching units connects to the AC terminal, and the other of the third switching units connects to the negative terminal.

11. The five-level converting device of claim 1, wherein the bidirectional switching circuit are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the two first switching units in the first bidirectional switching circuit, and a terminal of the second flying capacitor unit connects to a connection point between the first bidirectional switching circuit and the second bidirectional switching circuit.

12. The five-level converting device of claim 11, wherein an amount of the second switching units is two, another terminal of the first flying capacitor unit connects to a connection point between the two second switching units, one of the two second switching units connects to the positive terminal, and the other of the second switching units connects to the AC terminal.

13. The five-level converting device of claim 11, wherein an amount of the third switching units is two, another terminal of the second flying capacitor unit connects to a connection point between the two third switching units, one of the two third switching units connects to the AC terminal, and the other of the third switching units connects to the negative terminal.

14. The five-level converting device of claim 1, wherein the bidirectional switching circuit are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the first bidirectional switching circuit and the second bidirectional switching circuit, and a terminal of the second flying capacitor unit connects to a connection point between the two first switching units in the second bidirectional switching circuit.

15. The five-level converting device of claim 14, wherein an amount of the second switching unit is two, another terminal of the first flying capacitor unit connects to a connection point between the two second switching units, one of the two second switching units connects to the positive terminal, and the other of the second switching units connects to the AC terminal.

16. The five-level converting device of claim 14, wherein an amount of the third switching units is two, another terminal of the second flying capacitor unit connects to a connection point between the two third switching units, one of the two third switching units connects to the AC terminal, and the other of the third switching units connects to the negative terminal.

17. The five-level converting device of claim 1, wherein the bidirectional switching circuit are a first bidirectional switching circuit and a second bidirectional switching circuit, the first bidirectional switching circuit connects to the neutral point, the second bidirectional switching circuit connects to the AC terminal, a terminal of the first flying capacitor unit connects to a connection point between the first bidirectional switching circuit and the second bidirectional switching circuit, and a terminal of the second flying capacitor unit connects to a connection point between the two first switching units in the first bidirectional switching circuit.

18. The five-level converting device of claim 17, wherein an amount of the second switching units is two, another terminal of the first flying capacitor unit connects to a connection point between the two second switching units, one of the two second switching units connects to the positive terminal, and the other of the second switching units connects to the AC terminal.

19. The five-level converting device of claim 17, wherein an amount of the third switching units is two, another terminal of the second flying capacitor unit connects to a connection point between the two third switching units, one of the two third switching units connects to the AC terminal, and the other of the third switching units connects to the negative terminal.

20. The five-level converting device of claim 1, wherein each of the first switching units comprises at least one power semiconductor switch, and the power semiconductor switch is an insulated gate bipolar transistor (IGBT), a gate turn-off (GTO) thyristor or an integrated gate commutated thyristor (IGCT).

21. The five-level converting device of claim 1, wherein each of the second switching units and the third switching units comprises at least one power semiconductor switch.

22. The five-level converting device of claim 21, wherein the at least power semiconductor switches are more than one, and the power semiconductor switches connect in series.

23. The five-level converting device of claim 21, wherein the at least one power semiconductor switch is an IGBT, a GTO thyristor or an IGCT.

24. The five-level converting device of claim 2, wherein the at least one power semiconductor switch is a diode.

* * * * *